(12) United States Patent
Nagaki et al.

(10) Patent No.: US 11,664,634 B2
(45) Date of Patent: May 30, 2023

(54) WIRE OPERATING TOOL AND COMPONENT FOR WIRE OPERATING TOOL

(71) Applicant: NAGAKI SEIKI CO., LTD., Osaka (JP)

(72) Inventors: Takayuki Nagaki, Osaka (JP); Tomoharu Miyazawa, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 26 days.

(21) Appl. No.: 17/418,688

(22) PCT Filed: Nov. 1, 2019

(86) PCT No.: PCT/JP2019/042992
§ 371 (c)(1),
(2) Date: Jun. 25, 2021

(87) PCT Pub. No.: WO2020/137159
PCT Pub. Date: Jul. 2, 2020

(65) Prior Publication Data
US 2022/0013974 A1    Jan. 13, 2022

(30) Foreign Application Priority Data
Dec. 27, 2018 (JP) .............................. JP2018-245020

(51) Int. Cl.
*H01R 43/28* (2006.01)
*H01R 43/048* (2006.01)

(52) U.S. Cl.
CPC .......... *H01R 43/28* (2013.01); *H01R 43/048* (2013.01); *Y10T 29/5313* (2015.01)

(58) Field of Classification Search
CPC ...... H01R 43/28; H01R 43/048; H02G 1/088; H02G 7/05; H02G 1/14; Y10T 29/53683; Y10T 29/5313
USPC ................. 29/729, 731, 745, 787, 868, 871
See application file for complete search history.

(56) References Cited

FOREIGN PATENT DOCUMENTS

| JP | 2001078321 | * | 3/2001 |
|----|-----------|---|--------|
| JP | 2010051081 A | | 3/2010 |
| JP | 2010088256 A | | 4/2010 |
| JP | 2018074826 A | | 5/2018 |
| JP | 2018152940 A | | 9/2018 |

\* cited by examiner

*Primary Examiner* — Thiem D Phan
(74) *Attorney, Agent, or Firm* — Muncy, Geissler, Olds & Lowe, P.C.

(57) ABSTRACT

A wire operating tool, a component for the wire operating tool, a wire cutting and dividing method, and a wire connecting method are provided. The wire operating tool includes a first wire gripping tool; a first rod member connected to the first wire gripping tool and configured to be expanded and contracted in accordance with relative movement of a moving portion with respect to a base portion; a second wire gripping tool; a second rod member connected to the second wire gripping tool; a connecting member that connects the moving portion of the first rod member and the second rod member to each other in a separable manner; and a load bearing member configured to bear a tensile load acting on the first wire gripping tool and the second wire gripping tool when the moving portion of the first rod member and the second rod are in a separate state.

18 Claims, 18 Drawing Sheets

WIRE OPERATING TOOL AND COMPONENT FOR WIRE OPERATING TOOL

TECHNICAL FIELD

The present invention relates to a wire operating tool, a component for the wire operating tool, a wire cutting and dividing method, and a wire connecting method.

BACKGROUND ART

Electric wire cutting and dividing methods are known. In electric wire cutting and dividing methods, electric wire cutting and dividing tools are used. An electric wire cutting and dividing tool has a first electric wire gripping tool, a second electric wire gripping tool, and a telescopic rod arranged between the first electric wire gripping tool and the second electric wire gripping tool. When an electric wire is cut and divided by using an electric wire cutting and dividing tool, first, a first section of the electric wire is gripped by the first electric wire gripping tool, and a second section of the electric wire is gripped by the second electric wire gripping tool. Second, the telescopic rod is contracted so that the distance between the first electric wire gripping tool and the second electric wire gripping tool is reduced. As a result of the contraction, the electric wire located between the first electric wire gripping tool and the second electric wire gripping tool is loosened. Third, the electric wire is cut at a position between the first electric wire gripping tool and the second electric wire gripping tool (a position where the electric wire is loosened). Fourth, an electric wire support tool that supports one of the electric wire cut ends is rotated by 180 degrees about the telescopic rod to divide one electric wire cut end and the other electric wire cut end vertically from each other.

When one electric wire cut end and the other electric wire cut end are re-connected after completion of electric wire construction, first, the electric wire support tool that supports one of the electric wire cut ends is rotated by 180 degrees about the telescopic rod to align the position of one electric wire cut end with the position of the other electric wire cut end. Second, a first end of a connecting sleeve is mounted to one electric wire cut end. Third, the other electric wire cut end is inserted in a second end of the connecting sleeve with the position of the second end of the connecting sleeve being aligned with the other electric wire cut end. Fourth, the connecting sleeve is compressed and deformed to crimp the connecting sleeve, one electric wire cut end, and the other electric wire cut end together.

As a related art, Patent Literature 1 discloses an overhead wire construction assist tool. The overhead wire construction assist tool disclosed in Patent Literature 1 has a pair of wire grippers configured to grip a sheathed electric wire, a telescopic device configured to bend a section of the sheathed electric wire between the wire grippers, and a pair of gripping devices configured to grip sheathed portions near both ends at the cut positions of the cut sheathed electric wire between the wire grippers. Further, at least one of the pair of gripping devices is configured to be movable along the longitudinal direction of the telescopic device. In the overhead wire construction assist tool disclosed in Patent Literature 1, since at least one of the pair of gripping devices moves along the longitudinal direction of the telescopic device when the connecting sleeve is crimped together to core wires, flection of the connecting portion of electric wires is suppressed.

CITATION LIST

Patent Literature

Patent Literature 1: Japanese Patent Application Publication No. 2010-51081

SUMMARY OF INVENTION

Technical Problem

In such an electric wire cutting and dividing method, when one of the electric wire cut ends and the other electric wire cut end are re-connected, the method includes a step of aligning the position of one electric wire cut end with the position of the other electric wire cut end by rotating an electric wire support tool by 180 degrees, a step of mounting a first end of a connecting sleeve to one electric wire cut end, a step of inserting the other electric wire cut end in a second end of the connecting sleeve with the position of the second end of the connecting sleeve being aligned with the other electric wire cut end, and the like, and a worker's workload is high. In particular, in performing the above steps, when a worker inside a bucket of an aerial vehicle operates respective operating parts of the electric wire cutting and dividing tool via a long stick, this causes a large workload for the worker and a longer working time.

Accordingly, the object of the present invention is to provide a wire operating tool, a component for the wire operating tool, a wire cutting and dividing method, and a wire connecting method that reduce a worker's workload and enable the worker to safely and efficiently perform work such as wire cutting and dividing work, wire connecting work, or the like.

Solution to Problem

The present invention relates to a wire operating tool, a component for the wire operating tool, a wire cutting and dividing method, and a wire connecting method described below.

Advantageous Effect of Invention

According to the present invention, it is possible to provide a wire operating tool, a component for the wire operating tool, a wire cutting and dividing method, and a wire connecting method that reduce a worker's workload and enable the worker to safely and efficiently perform work such as wire cutting and dividing work, wire connecting work, or the like.

DESCRIPTION OF EMBODIMENTS

A wire operating tool 1, a component for the wire operating tool, a wire cutting and dividing method (a method of cutting a wire and separating two cut ends from each other), and a wire connecting method in the embodiments will be described in detail below with reference to the drawings. Note that, in this specification, members having the same type of function are labeled with the same or similar references. Further, duplicated description of the members labeled with the same or similar references may be omitted. Further, in this specification, "wire (wire material)" is "electric wire", for example. When "wire" is "electric wire", "wire operating tool", "first wire gripping tool", "second wire gripping tool", and "wire support tool" such as a first wire support tool in this specification mean "electric wire operating tool", "first electric wire gripping tool", "second electric wire gripping tool", and "electric wire support tool" such as a first electric wire support tool, respectively. The "wire (wire material)" in this specification may be a high-voltage power line.

[Definition of Directions]

In this specification, a direction along the longitudinal axis AX of a first rod member 3 from a moving portion 32 of the first rod member 3 to a base portion 30 of the first rod member 3 is defined as a "first direction", and the opposite direction to the "first direction" is defined as a "second direction".

First Embodiment

Figure 1:
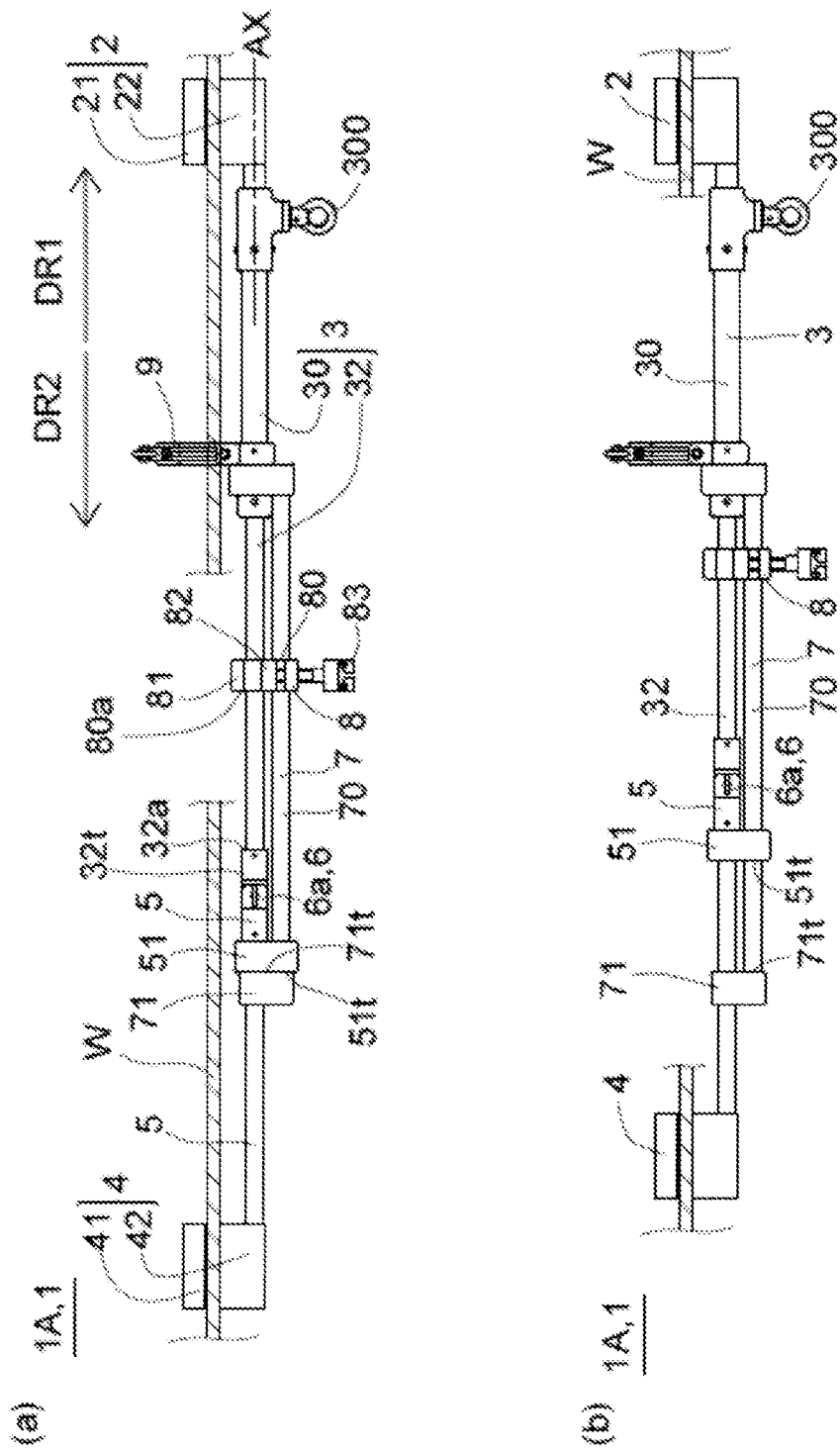
FIG. 1 is a schematic side view of a wire operating tool in a first embodiment.
Figure 2:
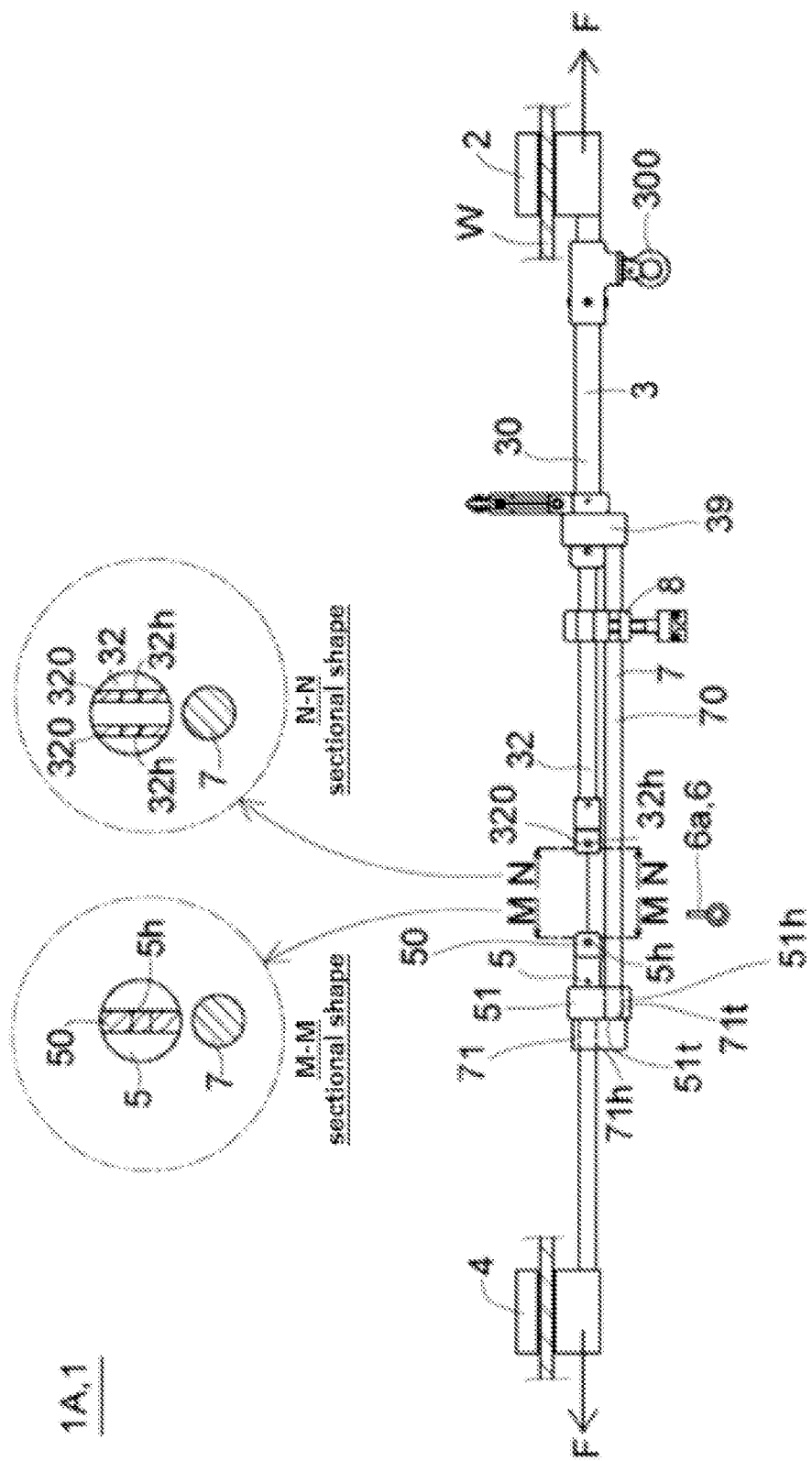
FIG. 2 is a schematic side view of the wire operating tool in the first embodiment.

A wire operating tool 1A in the first embodiment will be described with reference to FIG. 1 and FIG. 2. FIG. 1 and FIG. 2 are schematic side views of the wire operating tool 1A in the first embodiment.

The wire operating tool 1A includes a first wire gripping tool 2, a first rod member 3 connected to the first wire gripping tool 2, a second wire gripping tool 4, a second rod member 5 connected to the second wire gripping tool 4, a connecting member 6 that connects the first rod member 3 and the second rod member 5 in a separable manner, and a load bearing member 7. The wire operating tool 1A may have a fixing tool 8 that fixes a wire W or a connecting sleeve SV described later.

The first wire gripping tool 2 grips a first section of the wire W. The first wire gripping tool 2 has a first gripping piece 21 and a second gripping piece 22, for example, and clamps the first section of the wire W by the first gripping piece 21 and the second gripping piece 22.

The first rod member 3 is connected to the first wire gripping tool 2. The connection between the first rod member 3 and the first wire gripping tool 2 may be a connection that is swingable about an axis perpendicular to a first direction DR1 or may be a connection that is not swingable. Further, the first rod member 3 may be detachable from the first wire gripping tool 2 (in other words, the first wire gripping tool 2 and the first rod member 3 may be provided as separate members, and the first wire gripping tool 2 may be attached to the first rod member 3). Although the first rod member 3 is directly connected to the first wire gripping tool 2 in the example illustrated in FIG. 1(a), the first rod member 3 may be indirectly connected to the first wire gripping tool 2.

The first rod member 3 includes a base portion 30 and a moving portion 32. The first rod member 3 can be expanded and contracted in accordance with relative movement of the moving portion 32 with respect to the base portion 30. The first rod member 3 has a connecting mechanism (a gear mechanism, a screw mechanism, or the like) that connects the base portion 30 and the moving portion 32 to each other so as to allow relative movement, and the first rod member 3 is expanded or contracted in accordance with operation of an operating part 300 provided to the base portion 30. The operating part 300 is operated by using a remote operating tool, for example. The first rod member 3 is made of a fiber reinforced plastic (FRP), for example. Note that the sectional shape of the first rod member 3 (the base portion 30 and the moving portion 32) is not particularly limited as long as the base portion 30 and the moving portion 32 can move relative to each other, may be circular, elliptical, polygonal, hemispherical, or the like, and may be selected as appropriate.

The second wire gripping tool 4 grips the second section of the wire W. The second wire gripping tool 4 includes a first gripping piece 41 and a second gripping piece 42, for example, and clamps the second section of the wire W by the first gripping piece 41 and the second gripping piece 42.

The second rod member 5 is connected to the second wire gripping tool 4. The connection between the second rod member 5 and the second wire gripping tool 4 may be a connection that is swingable about an axis perpendicular to the first direction DR1 or may be a connection that is not swingable. Further, the second rod member 5 may be detachable from the second wire gripping tool 4 (in other words, the second wire gripping tool 4 and the second rod member 5 may be provided as separate members, and the second wire gripping tool 4 may be attached to the second rod member 5). The second rod member 5 is made of a fiber reinforced plastic (FRP), for example. Although the second rod member 5 is directly connected to the second wire gripping tool 4 in the example illustrated in FIG. 1(a), the second rod member 5 may be indirectly connected to the second wire gripping tool 4.

The connecting member 6 connects the moving portion 32 of the first rod member 3 and the second rod member 5 to each other in a separable manner. In the example illustrated in FIG. 1(a), the tip of the moving portion (the end on the second direction DR2 side) and the tip of the second rod member 5 (the end on the first direction DR1 side) are connected to each other via the connecting member 6.

As illustrated in FIG. 1(b), when the moving portion 32 moves relative to the base portion 30 with the moving portion 32 of the first rod member 3 being connected to the second rod member 5, the second rod member 5 will also move relative to the base portion 30 of the first rod member 3. On the other hand, as illustrated in FIG. 2 as an example, when the moving portion 32 moves relative to the base portion 30 with the moving portion 32 of the first rod member 3 and the second rod member 5 being separate from each other, the moving portion 32 of the first rod member 3 will move relative to the second rod member 5.

Figure 6:
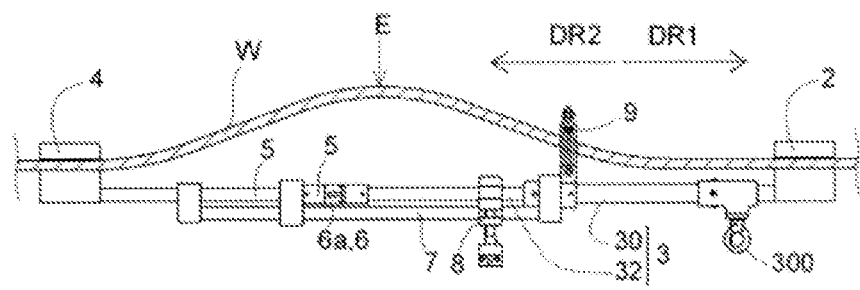
FIG. 6 is a diagram schematically illustrating one step of the wire cutting and dividing method in the first embodiment.
Figure 7:
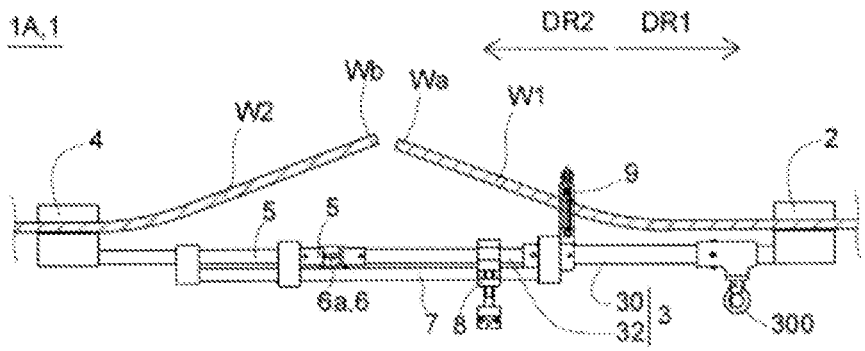
FIG. 7 is a diagram schematically illustrating one step of the wire cutting and dividing method in the first embodiment.

As illustrated in FIG. 1(b) or FIG. 6 as an example, it is assumed that the first rod member 3 is contracted in a state where the first wire gripping tool 2 grips the first section of the wire W and the second wire gripping tool 4 grips the second section of the wire W. More specifically, it is assumed that the moving portion of the first rod member 3 is moved in the first direction DR1 (in other words, a direction toward the base portion 30) when the moving portion 32 of the first rod member 3 and the second rod member 5 are in a connected state. In such a case, since the distance between the first wire gripping tool 2 and the second wire gripping tool 4 decreases, it is possible to flex the section of the wire W between the first wire gripping tool 2 and the second wire gripping tool 4. As a result, it is possible to easily cut the section of the wire W between the first wire gripping tool 2 and the second wire gripping tool 4 (in other words, the flexed section of the wire W) by using any cutting tool.

Figure 14:
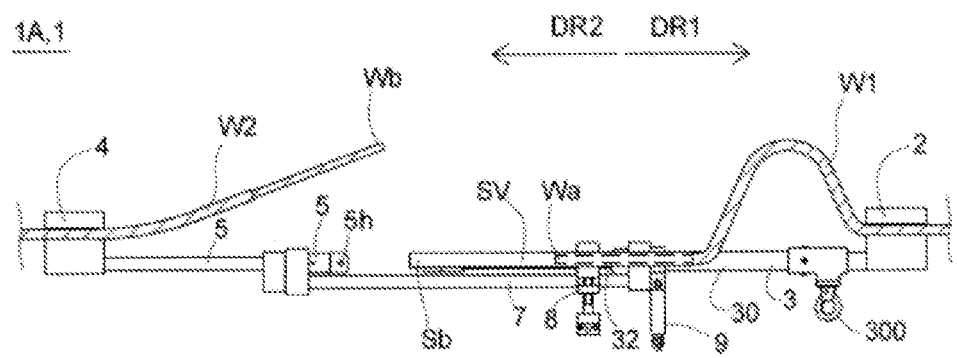
FIG. 14 is a diagram schematically illustrating one step of the wire connecting method in the first embodiment.

On the other hand, as illustrated in FIG. 14 as an example, it is assumed that the first rod member 3 is contracted with a first wire W1 (or the connecting sleeve SV in which the end of the first wire W1 is inserted) being fixed to the fixing tool 8. More specifically, it is assumed that the moving portion 32 of the first rod member 3 is moved in the first direction DR1 (in other words, a direction toward the base portion 30) when the moving portion 32 of the first rod member 3 and the second rod member 5 are in a separate state. In such a case, due to the movement of the moving portion 32, the first wire W1 (or the connecting sleeve SV) fixed to the fixing tool 8 moves in a direction away from the second rod member 5. This movement facilitates at least a part of the work of connecting a first cut end Wa of the first wire W1 and a second cut end Wb of a second wire W2 to each other (for example, work of inserting the second cut end Wb in the connecting sleeve SV).

In the example illustrated in FIG. 2, the connecting member 6 includes a pin member 6a that connects the moving portion 32 of the first rod member 3 and the second rod member 5 to each other. The moving portion 32 of the first rod member 3 is provided with a first hole 32h that accepts the connecting member 6 (more specifically, the pin member 6a), and the second rod member 5 is provided with a second hole 5h that accepts the connecting member 6 (more specifically, the pin member 6a). Further, when the connecting member 6 is inserted in both the first hole 32h and the second hole 5h, the moving portion 32 of the first rod member 3 and the second rod member 5 are in a connected state. On the other hand, when the connecting member 6 is taken out from at least one of the first hole 32h and the second hole 5h, the moving portion 32 of the first rod member 3 and the second rod member 5 are in a separate state. In the example illustrated in FIG. 2, the first hole 32h is formed in a plate 320 arranged at the tip of the moving portion 32. Further, the second hole 5h is arranged in a plate 50 arranged at the tip of the second rod member 5.

Note that the shape and the structure of the connecting member 6 are not limited to the example illustrated in FIG. 2. As the shape and the structure of the connecting member 6, any shape and structure can be employed as long as it can connect and separate the moving portion 32 of the first rod member 3 and the second rod member 5 to and from each other. For example, the connecting member 6 may include an engaging protruding part and an engaging recess part (or an engaging groove) that connect the moving portion 32 of the first rod member 3 and the second rod member 5 to each other.

The load bearing member 7 bears a tensile load acting on the first wire gripping tool 2 and the second wire gripping tool 4 when the moving portion 32 of the first rod member 3 and the second rod member 5 are in a separate state. Details thereof will be described later.

The fixing tool 8 is a member that fixes the wire W (for example, the first wire W1) or the connecting sleeve SV (for example, a connecting sleeve that connects the end of the first wire W1 and the end of the second wire W2 to each other). In the example illustrated in FIG. 1(a), the fixing tool 8 has a first gripping piece 81, a second gripping piece 82, and a fixing tool operating part 83. In the example illustrated in FIG. 1(a), by operating the fixing tool operating part 83 by using a remote operating tool or the like, it is possible to change the distance between the first gripping piece 81 and the second gripping piece 82.

By operating the fixing tool operating part 83 to reduce the distance between the first gripping piece 81 and the second gripping piece 82, it is possible to fix the wire W (for example, the first wire W1) or the connecting sleeve SV to the fixing tool 8. Further, by operating the fixing tool operating part 83 to increase the distance between the first gripping piece 81 and the second gripping piece 82, it is possible to detach the wire W (for example, the first wire W1) or the connecting sleeve SV from the fixing tool 8.

In the example illustrated in FIG. 1(a), the fixing tool 8 is movable together with the moving portion 32 of the first rod member 3. More specifically, the fixing tool 8 has a connecting portion 80, and the connecting portion 80 is fixed to the moving portion 32 of the first rod member 3. Thus, movement of the moving portion 32 causes the fixing tool 8 fixed to the moving portion 32 to move together with the moving portion 32.

Alternatively, the connecting portion 80 of the fixing tool 8 may be slidable with respect to the moving portion 32 of the first rod member 3. In such a case, the configuration may be such that the fixing tool 8 moves together with the moving portion 32 of the first rod member 3 when a pressing portion 32a provided to the moving portion 32 presses a pressed portion 80a provided to the fixing tool 8. Note that, when the fixing tool 8 is slidable with respect to the moving portion 32 of the first rod member 3, a remote operating tool or the like may be used to cause the fixing tool 8 to move relative to the moving portion 32.

In the example illustrated in FIG. 1(a), the fixing tool 8 is arranged in the middle part of the moving portion 32. Alternatively, the fixing tool 8 may be either arranged at a tip 32t of the moving portion 32 or slidable between the tip 32t and the base end of the moving portion 32. It is assumed that a rod-like component forming the middle part of the moving portion 32 is made of a non-metal, at least a part of the fixing tool 8 is made of a metal, and the tip 32t includes a metal connecting fitting that accepts the connecting member 6. In such a case, by arranging the fixing tool 8, which is at least partially made of a metal, around the tip 32t, which is at least partially made of metal, it is possible to gather metal members around the tip 32t. As a result, for example, this makes it easier to put an insulating cover over the portion where metal materials are arranged during suspension of work performed by using a wire operating tool attached to a wire. Note that the fixing tool 8 at least partially made of a metal may be configured to be attachable to the tip 32t at least partially made of a metal, or the fixing tool 8 at least partially made of a metal and the tip 32t at least partially made of a metal may be integrally formed.

[Optional Additional Feature]

Optional additional features that can be employed in the wire operating tool 1A in the first embodiment will be described.

In the example illustrated in FIG. 1(a) and FIG. 1(b), the wire operating tool 1A has the load bearing member 7, and the load bearing member 7 has a first load transfer surface 71t. Further, the wire operating tool LA has the second rod member 5, and the second rod member 5 (more specifically, a second connecting portion 51 of the second rod member 5) has a second load transfer surface 51t. The first load transfer surface 71t and the second load transfer surface 51t can come into contact with each other and can be spaced apart from each other.

As illustrated in FIG. 2 as an example, it is assumed that, when the moving portion 32 of the first rod member 3 and the second rod member 5 are in a separate state, tensile load F acts on the first wire gripping tool 2 and the second wire gripping tool 4. Note that the tensile load F acting on the first wire gripping tool 2 and the second wire gripping tool 4 means a load acting in a direction in which the first wire gripping tool 2 and the second wire gripping tool 4 move away from each other.

In the example illustrated in FIG. 2, the wire operating tool 1A has the load bearing member 7. Thus, even when the moving portion 32 of the first rod member 3 and the second rod member 5 are in a separate state, the load bearing member 7 can bear the tensile load acting on the first wire gripping tool 2 and the second wire gripping tool 4. In other words, even when the moving portion 32 of the first rod member 3 and the second rod member 5 are in a separate state and the tensile load F acts on the first wire gripping tool 2 and the second wire gripping tool 4, the distance between the first wire gripping tool 2 and the second wire gripping tool 4 is maintained by the load bearing member 7.

In the example illustrated in FIG. 2, the first load transfer surface 71t and the second load transfer surface 51t are in contact with each other. Thus, the tensile load F acting on the second wire gripping tool 4 is transferred to the load bearing member 7 via the second rod member 5, the second load transfer surface 51t, and the first load transfer surface 71t. Further, in the example illustrated in FIG. 2, the load bearing member 7 is fixed to the base portion 30 of the first rod member 3. More specifically, the load bearing member 7 is fixed to the base portion 30 of the first rod member 3 via a connecting block 39. Thus, the tensile load F acting on the first wire gripping tool 2 is transferred to the load bearing member 7 via the base portion 30 of the first rod member 3 and the connecting block 39.

Note that, in the example illustrated in FIG. 2, the load bearing member 7 has a first connecting portion 71 that connects the load bearing member 7 to the second rod member 5 in a slidable manner, and the first load transfer surface 71t is provided to the first connecting portion 71. The first connecting portion 71 has a through hole 71h that accepts the second rod member 5 in a slidable manner.

Further, in the example illustrated in FIG. 2, the second rod member 5 has a second connecting portion 51 that connects the second rod member 5 to the load bearing member 7 in a slidable manner, and the second connecting portion 51 is provided with the second load transfer surface 51t. The second connecting portion 51 has a through hole 51h that accepts a rod-like portion 70 of the load bearing member 7 in a slidable manner. In such a case, the first connecting portion 71, the second connecting portion 51, the second rod member 5, and the rod-like portion 70 suppress the second rod member 5 from rotating about the longitudinal axis of the second rod member 5. Thus, the second rod member 5 does not rotate unintentionally, and an operation to change the state of the moving portion 32 of the first rod member 3 and the second rod member 5 from a separate state to a connected state (or operation to change the state from a connected state to a separate state) is not interfered by the rotation of the second rod member 5.

In the example illustrated in FIG. 2, the wire operating tool 1A has the first connecting portion 71 and the second connecting portion 51. Thus, relative slide movement between the load bearing member 7 and the second rod member 5 is smoothly performed. Note that, in terms of smooth relative slide movement between the load bearing member 7 and the second rod member 5, it is preferable that the longitudinal axis of the second rod member 5 and the longitudinal axis of the rod-like portion 70 of the load bearing member 7 be parallel to each other.

As illustrated in FIG. 1(a), the wire operating tool 1A may have a wire support tool 9 that supports the wire W. In the example illustrated in FIG. 1(a), the wire support tool 9 is fixed to the first rod member 3 (more specifically, the base portion 30 of the first rod member 3). The wire support tool 9 can support the wire W (or the first wire W1 described later that is formed due to cutting of the wire W).

When the wire operating tool 1A has the wire support tool 9, the wire W (or the first wire W1 that is formed due to cutting of the wire W) is suitably positioned by the wire support tool 9. Further, looseness (flection) of the wire W (or the first wire W1) is suppressed.

Figure 3:
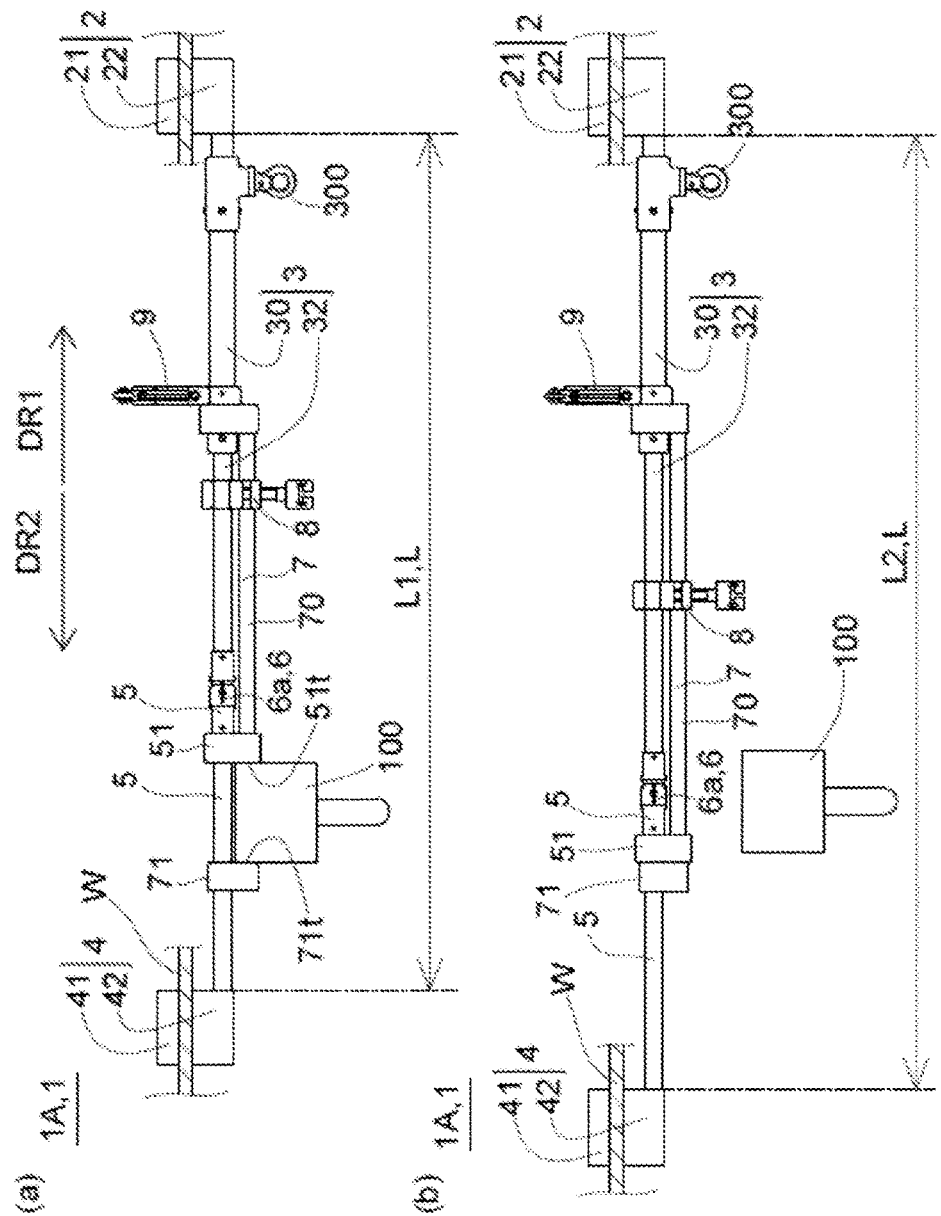
FIG. 3 is a schematic side view of the wire operating tool in the first embodiment.

As illustrated in FIG. 3(a) and FIG. 3(b), the wire operating tool 1A may have a stopper member 100 that changes the maximum separation distance L between the first wire gripping tool 2 and the second wire gripping tool 4. When the wire operating tool 1A has the stopper member 100, the wire operating tool 1A can be mounted to the wire W in a state where the maximum separation distance L is small (see FIG. 3(a)), and the wire operating tool 1A can be detached from the wire W in a state where the maximum separation distance L is large (see FIG. 3(b)), in other words, the tensile load acting on the wire operating tool 1A is small. In such a case, the work of detaching the wire operating tool 1A from the wire W is facilitated.

Note that, in the example illustrated in FIG. 3(a), the stopper member 100 is arranged between the first load transfer surface 71t and the second load transfer surface 51t. Further, the maximum separation distance L when the stopper member 100 is arranged between the first load transfer surface 71t and the second load transfer surface 51t is a distance L1, and the maximum separation distance L when the stopper member 100 is not arranged between the first load transfer surface 71t and the second load transfer surface 51t is a distance L2. The distance L1 is smaller than the distance L2.

Note that the shape and the structure of the stopper member 100 are not limited to the example illustrated in FIG. 3(a) and FIG. 3(b). As the shape and the structure of the stopper member 100, any shape and structure may be employed as long as the maximum separation distance L between the first wire gripping tool 2 and the second wire gripping tool 4 can be change. For example, the stopper member 100 may be a pin member that can project out of the outer circumference surface of the rod-like portion 70 of the load bearing member 7. In such a case, the maximum separation distance L when the pin member projects out of the outer circumference surface of the rod-like portion 70 is the distance L1, and the maximum separation distance L when the pin member does not project out of the outer circumference surface of the rod-like portion 70 is the distance L2.

[Wire Cutting and Dividing Method]

Figure 4:
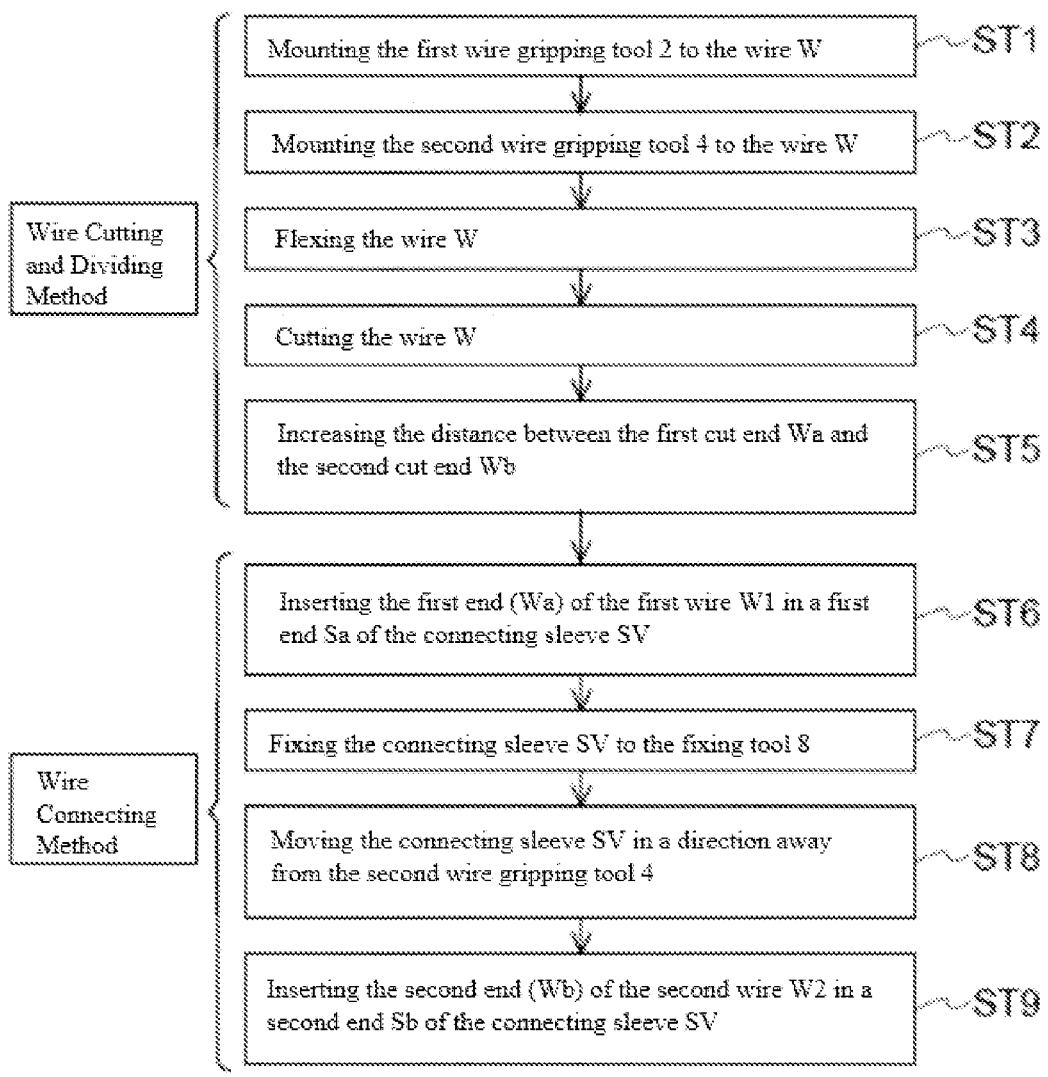
FIG. 4 is a flowchart illustrating an example of a wire cutting and dividing method and a wire connecting method in the first embodiment.

The wire cutting and dividing method in the first embodiment will be described with reference to FIG. 4 to FIG. 10. FIG. 4 is a flowchart illustrating an example of the wire cutting and dividing method in the first embodiment. FIG. 5 to FIG. 10 are diagrams each schematically illustrating one step of the wire cutting and dividing method in the first embodiment.

The wire cutting and dividing method in the first embodiment is performed by using the wire operating tool 1. The wire operating tool 1 used in the wire cutting and dividing method in the first embodiment may be the wire operating tool 1A in the first embodiment or may be other wire operating tools.

The wire operating tool 1 used in the wire cutting and dividing method in the first embodiment has the first wire gripping tool 2, the first rod member 3 that is connected to the first wire gripping tool 2 and can be expanded and contracted in accordance with the moving portion 32 moving relative to the base portion 30, the second wire gripping tool 4, the second rod member 5 connected to the second wire gripping tool 4, and the connecting member 6 that connects the first rod member 3 and the second rod member 5 in a separable manner. The wire operating tool 1 may have at least one of the load bearing member 7, the fixing tool 8 that fixes a wire such as the first wire W1 (or the connecting sleeve SV in which the end of a wire such as the first wire W1 is inserted), and the wire support tool 9 that supports the wire W.

Figure 5:
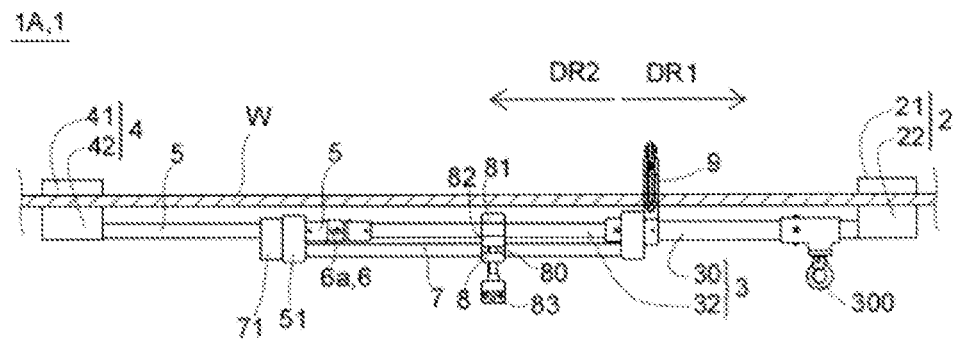
FIG. 5 is a diagram schematically illustrating one step of the wire cutting and dividing method in the first embodiment.

In the first step ST1, the first wire gripping tool 2 is mounted to the wire W. In the second step ST2, the second wire gripping tool 4 is mounted to the wire W. Note that the second step ST2 may be performed after the first step ST1 or may be performed before the second step ST2. FIG. 5 illustrates the state of the wire operating tool 1 after the first step ST1 and the second step ST2 have been performed.

In the third step ST3, the distance between the first wire gripping tool 2 and the second wire gripping tool 4 is reduced to flex the wire W (see FIG. 6). The third step ST3 can be performed by contracting the first rod member 3. Note that the third step ST3 (in other words, the step of flexing the wire W) is performed in a connected state where the moving portion 32 of the first rod member 3 and the second rod member 5 are connected to each other.

In the fourth step ST4, the wire W is cut at the position between the first wire gripping tool 2 and the second wire gripping tool 4 (for example, the position indicated by the arrow E in FIG. 6). Because of cutting of the wire W, the first cut end Wa and the second cut end Wb are formed in the wire W (see FIG. 7).

Figure 8:
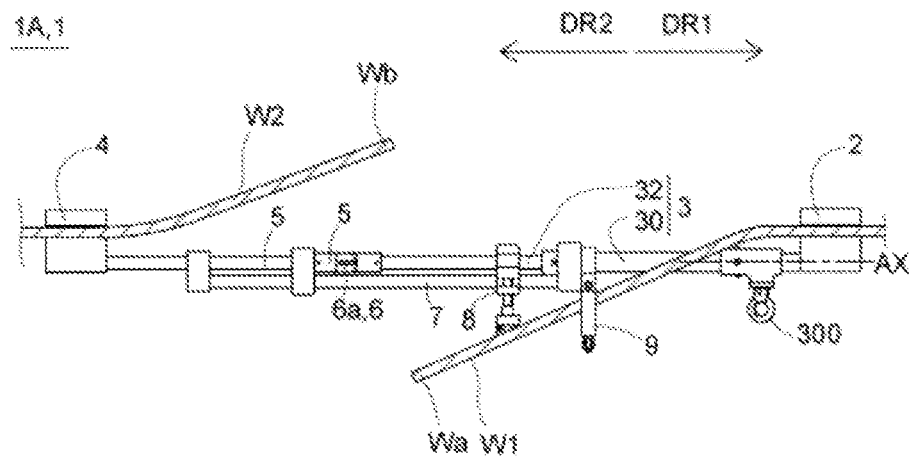
FIG. 8 is a diagram schematically illustrating one step of the wire cutting and dividing method in the first embodiment.

In the fifth step ST5, the distance between the first cut end Wa and the second cut end Wb is increased. FIG. 8 illustrates a state of the wire operating tool 1 after the fifth step ST5 has been performed.

The step of increasing the distance between the first cut end Wa and the second cut end Wb is performed by rotating the wire support tool 9 (more specifically, the wire support tool 9 supporting the first wire W1 having the first cut end Wa) about the first rod member 3, for example.

Figure 9:
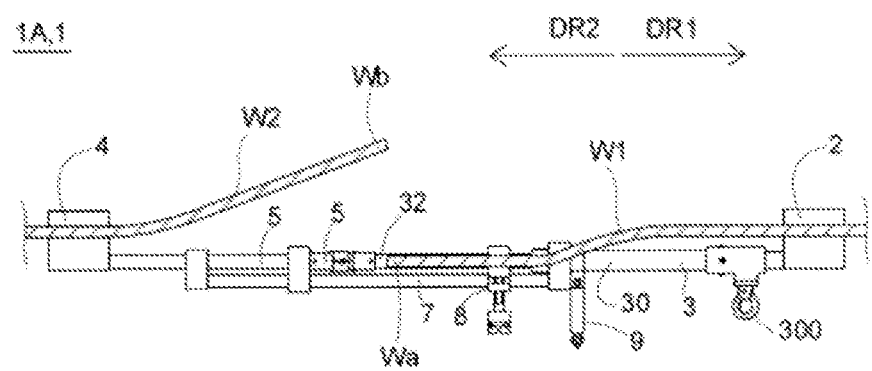
FIG. 9 is a diagram schematically illustrating one step of the wire cutting and dividing method in the first embodiment.

Alternatively, as illustrated in FIG. 9 as an example, the step of increasing the distance between the first cut end Wa and the second cut end Wb may be performed by fixing the first wire W1 having the first cut end Wa to the fixing tool 8.

Figure 10:
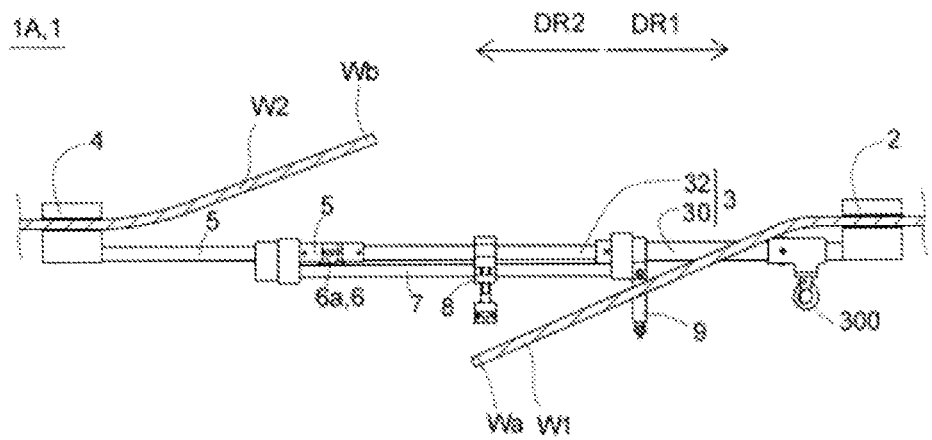
FIG. 10 is a diagram schematically illustrating one step of the wire cutting and dividing method in the first embodiment.

Note that the fifth step ST5 (in other words, the step of increasing the distance between the first cut end Wa and the second cut end Wb) may include increasing the distance between the first cut end Wa and the second cut end Wb by expanding the first rod member 3, as illustrated in FIG. 10 as an example. The expansion of the first rod member 3 is performed by moving the moving portion 32 relative to the base portion 30 in a connected state where the moving portion 32 of the first rod member 3 and the second rod member 5 are connected to each other, for example.

In the first embodiment, the wire W can be flexed by contracting the first rod member 3 (third step ST3). Further, in the first embodiment, it is possible to increase the distance between the first cut end Wa and the second cut end Wb with simple work or operation (fifth step ST5). Thus, the use of the wire operating tool 1A in the first embodiment and/or the wire cutting and dividing method in the first embodiment enables safe and efficient cutting and dividing work of the wire W to be implemented. Further, the workload on the worker performing cutting and dividing work of the wire W is reduced.

[Wire Connecting Method]

The wire connecting method in the first embodiment will be described with reference to FIG. 4 and FIG. 11 to FIG. 15. FIG. 4 is a flowchart illustrating an example of the wire connecting method in the first embodiment. FIG. 11 to FIG. 15 are diagrams each schematically illustrating one step of the wire connecting method in the first embodiment.

The wire connecting method in the first embodiment is performed by using the wire operating tool 1. The wire operating tool 1 used in the wire connecting method in the first embodiment may be the wire operating tool LA in the first embodiment or may be other wire operating tools.

When the "wire" is an "electric wire", it is assumed that the insulating sheath has been removed from the first end of the first wire W1 (first cut end Wa) and the second end of the second wire W2 (second cut end Wb) before the wire connecting method (in other words, the electric wire connecting method) is performed, and the core wires of the wire W (that is, the electric wire) are exposed at the first end (Wa) and the second end (Wb).

Figure 11:
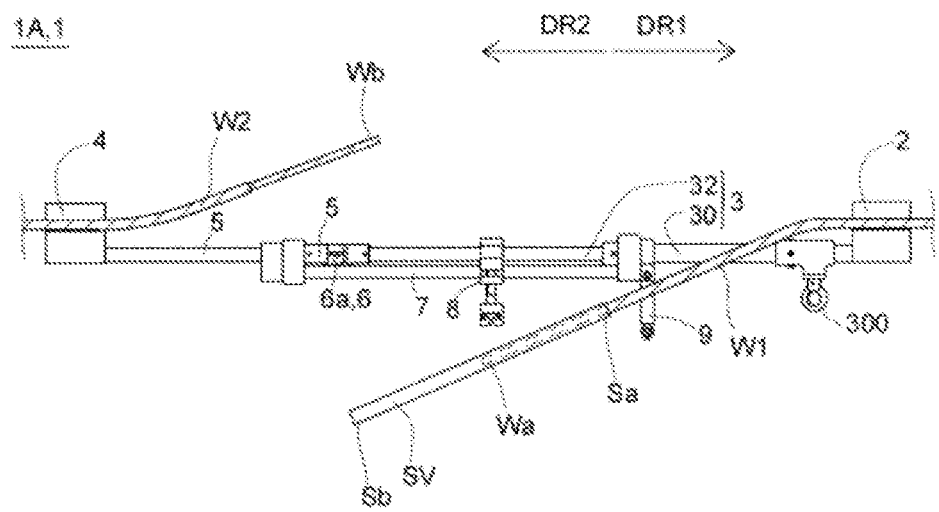
FIG. 11 is a diagram schematically illustrating one step of the wire connecting method in the first embodiment.

In the sixth step ST6, the first end (Wa) of the first wire W1 gripped by the first wire gripping tool 2 is inserted in a first end Sa of the connecting sleeve SV (see FIG. 11). Note that the sixth step ST6 is performed after the fifth step ST5 of the wire cutting and dividing method described above, for example.

For example, the sixth step ST6 is performed by using any remote operating tool to insert the first end (Wa) of the first wire W1 in the first end Sa of the connecting sleeve SV.

Figure 13:
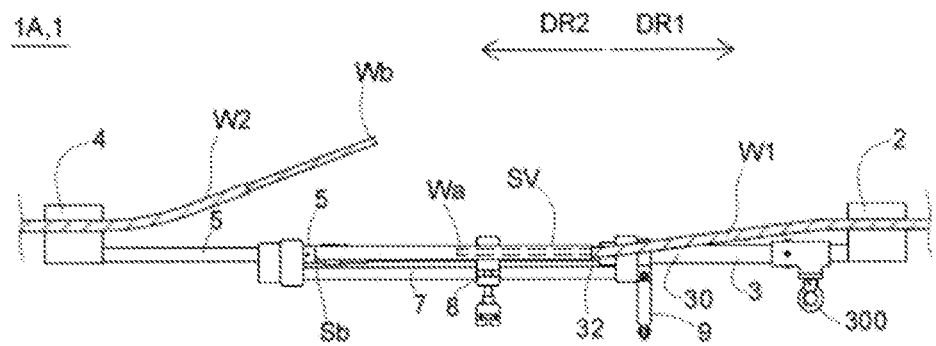
FIG. 13 is a diagram schematically illustrating one step of the wire connecting method in the first embodiment.

In the seventh step ST7, the connecting sleeve SV is fixed to the fixing tool 8 (see FIG. 13). Although it is preferable that the seventh step ST7 be performed after the sixth step ST6 has been performed, the seventh step ST7 may be performed before the sixth step ST6 is performed.

In the eighth step ST8, the fixing tool 8 and the connecting sleeve SV fixed to the fixing tool 8 are moved in the first direction DR1, in other words, a direction away from the second wire gripping tool 4 (see FIG. 14). Such movement is performed by moving the moving portion 32 relative to the base portion 30 in a separate state where the moving portion 32 of the first rod member 3 and the second rod member 5 are separated from each other.

To move the fixing tool 8 and the connecting sleeve SV in a separate state where the moving portion 32 of the first rod member 3 and the second rod member 5 are separated from each other, the connected state between the moving portion 32 of the first rod member 3 and the second rod member 5 (more specifically, the connected state via the connecting member 6 between the moving portion 32 of the first rod member 3 and the second rod member 5) is released before the eighth step ST8 is performed. Such release of the connected state may be performed before the seventh step ST7 or may be performed after the seventh step ST7. Further, such release of the connected state may be performed before the sixth step ST6 or may be performed after the sixth step ST6.

Figure 12:
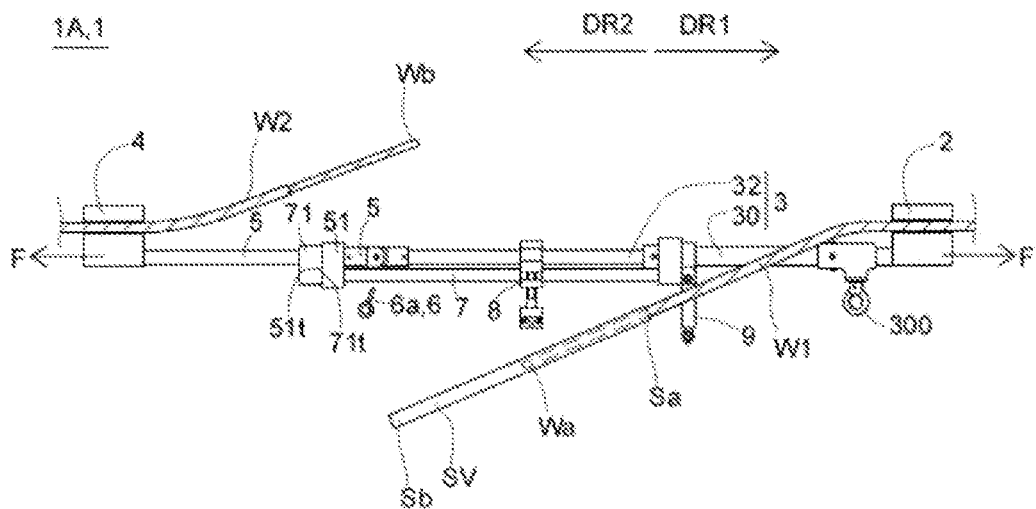
FIG. 12 is a diagram schematically illustrating one step of the wire connecting method in the first embodiment.

In the example illustrated in FIG. 12, the connected state between the moving portion 32 of the first rod member 3 and the second rod member 5 is released by pulling the connecting member 6 (for example, the pin member 6a), which connects the moving portion 32 of the first rod member 3 and the second rod member 5 to each other, out of at least one of the moving portion 32 of the first rod member 3 and the second rod member 5.

Note that, as illustrated in FIG. 12 as an example, it is preferable that the work to pull the connecting member 6 (for example, the pin member 6a) out of at least one of the moving portion 32 of the first rod member 3 and the second rod member 5 be performed with the first load transfer surface 71t of the load bearing member 7 and the second load transfer surface 51t of the second rod member 5 being in contact with each other. In a state where the first load transfer surface 71t and the second load transfer surface 51t are in contact with each other, at least a part of the tensile load F acting on the first wire gripping tool 2 and the second wire gripping tool 4 will be borne by the load bearing member 7. In such a case, the load acting on the connecting member 6 becomes substantially zero or decreases. Thus, it is easy to pull the connecting member 6 out in a state where the first load transfer surface 71t and the second load transfer surface 51t are in contact with each other.

In the example illustrated in FIG. 12, the connecting member 6 (more specifically, the pin member 6a) has been completely detached from both the moving portion 32 of the first rod member 3 and the second rod member 5. Alternatively, the connecting member 6 (more specifically, the pin member 6a) may be in connection with the moving portion 32 of the first rod member 3 or the second rod member 5 after the connected state between the moving portion 32 of the first rod member 3 and the second rod member 5 has been released. In such a case, the connecting member 6 will not be lost.

Figure 15:
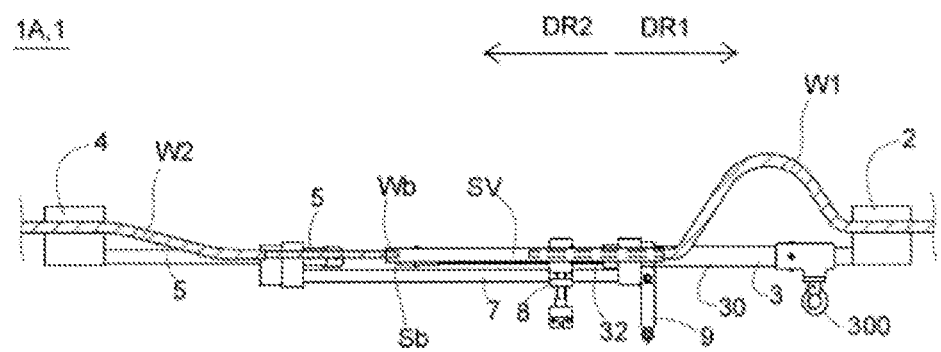
FIG. 15 is a diagram schematically illustrating one step of the wire connecting method in the first embodiment.

Subsequently, in the ninth step ST9, the second end (Wb) of the second wire W2 gripped by the second wire gripping tool 4 is inserted in a second end Sb of the connecting sleeve SV (see FIG. 15). It is preferable that the ninth step ST9 include a step of expanding the first rod member 3. The expansion of the first rod member 3, in other words, the movement of the moving portion 32 in the second direction DR2 is performed in the separate state where the moving portion 32 of the first rod member 3 and the second rod member 5 are separated from each other (or the connected state where the moving portion 32 of the first rod member 3 and the second rod member 5 are connected to each other), for example.

With the steps described above, the first end (Wa) of the first wire W1 and the second end (Wb) of the second wire W2 are connected to each other via the connecting sleeve SV. Note that, after the ninth step ST9, the connecting sleeve SV may be crimped, the connecting sleeve SV and the first end (Wa) may be crimped together, and the connecting sleeve SV and the second end (Wb) may be crimped together.

In the wire connecting method in the first embodiment, it is possible to insert the end of the first wire W1 in the first end Sa of the connecting sleeve SV with simple work (sixth step ST6). Further, in the example illustrated in FIG. 11, in the first wire W1, the section inserted in the connecting sleeve SV (more specifically, a core wire exposed section) is straight or curved to a small degree. It is therefore possible to easily implement the sixth step ST6 (in other words, the step of inserting the end of the first wire W1 in the connecting sleeve SV), and this significantly reduces the workload in inserting the end of the first wire W1 in the connecting sleeve SV. Further, when inserting the end of the first wire W1 in the connecting sleeve SV, the worker is not required to take any uncomfortable posture or difficult action. This enables the worker to perform wire connecting work safely and efficiently.

In the wire connecting method in the first embodiment, it is possible to insert the end of the second wire W2 in the second end Sb of the connecting sleeve SV with simple work or operation (ninth step ST9). Further, in the example illustrated in FIG. 14 and FIG. 15, in the second wire W2, the section located between the second wire gripping tool 4 and the connecting sleeve SV is straight or curved to a small degree. It is therefore possible to easily implement the ninth step ST9 (in other words, the step of inserting the end of the second wire W2 in the connecting sleeve SV), and this significantly reduces the workload in inserting the end of the second wire W2 in the connecting sleeve SV. Further, when inserting the end of the second wire W2 in the connecting sleeve SV, the worker is not required to take any uncomfortable posture or difficult action. This enables the worker to perform wire connecting work safely and efficiently.

Further, in the wire connecting method in the first embodiment, it is possible to move the moving portion 32 without involving any change in the distance between the first wire gripping tool 2 and the second wire gripping tool 4 after the wire W is cut. More specifically, in the wire connecting method in the first embodiment, if the moving portion 32 moves relative to the base portion 30 in a separate state where the moving portion 32 of the first rod member 3 and the second rod member 5 are separated from each other, the distance between the first wire gripping tool 2 and the second wire gripping tool 4 does not change. In such a case, the tensile force acting on the first wire W1 or the second wire W2 gripped by the first wire gripping tool 2 or the second wire gripping tool 4 does not change, or the flection amount of the first wire W1 or the second wire W2 does not change. It is therefore possible to more stably and safely implement wire connecting work. Moreover, when the change in the flection amount of the first wire W1 or the second wire W2 is suppressed, this reduces a risk of the first wire W1 or the second wire W2 coming into contact with another wire or the like arranged below.

Second Embodiment

Figure 16:
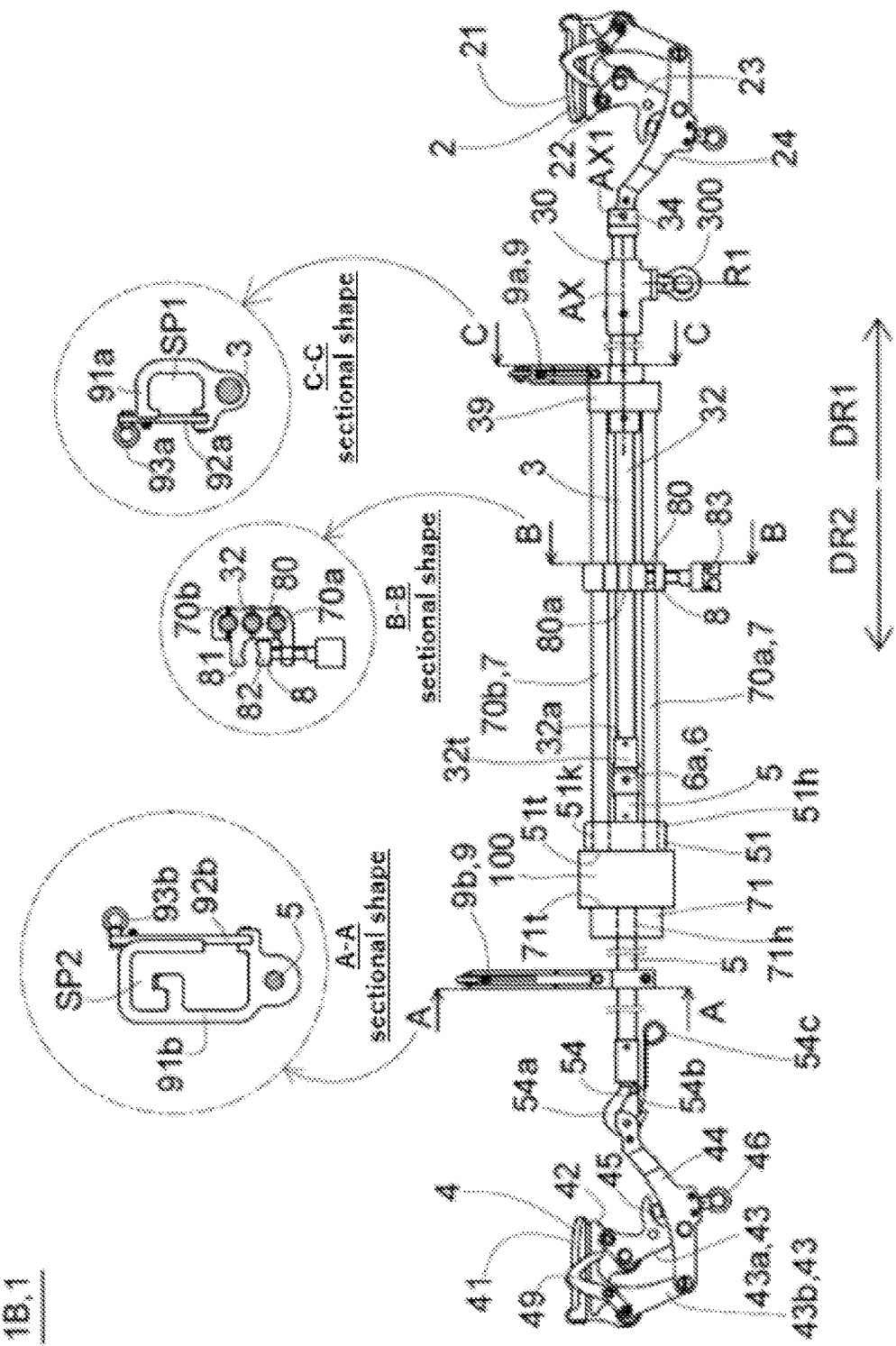
FIG. 16 is a schematic side view of a wire operating tool in a second embodiment.
Figure 17:
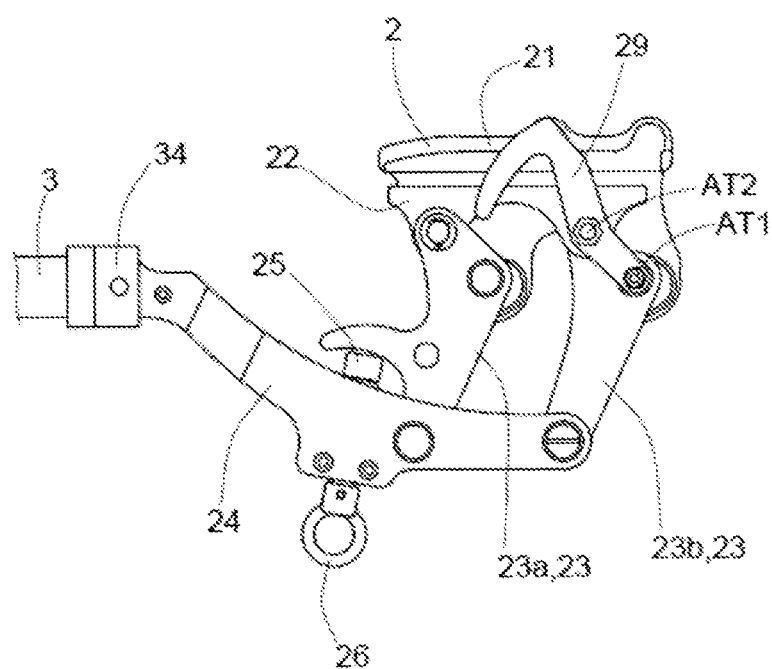
FIG. 17 a schematic side view schematically illustrating an example of a first wire gripping tool.

A wire operating tool 1B in the second embodiment will be described with reference to FIG. 16 and FIG. 17. FIG. 16 is a schematic side view of the wire operating tool 1B in the second embodiment. FIG. 17 is a schematic side view schematically illustrating an example of the first wire gripping tool 2.

In the second embodiment, features different from those of the first embodiment will be mainly described, and duplicated description for subjects that have already been described in the first embodiment will be omitted. It is therefore obvious that, even though not explicitly described in the second embodiment, the subjects that have already been described in the first embodiment can be employed in the second embodiment.

The wire operating tool 1B in the second embodiment includes the first wire gripping tool 2, the first rod member 3, the second wire gripping tool 4, the second rod member 5, the connecting member 6, the load bearing member 7, and the fixing tool 8. The wire operating tool 1B may have the wire support tool 9. Further, the wire support tool 9 may include a first wire support tool 9a attached to the first rod member 3 (more specifically, the base portion 30 of the first rod member 3) and a second wire support tool 9b attached to the second rod member 5.

[First Wire Gripping Tool 2]

The first wire gripping tool 2 has the first gripping piece 21 and the second gripping piece 22 and clamps the first section of the wire W by the first gripping piece 21 and the second gripping piece 22.

In the example illustrated in FIG. 17, the first gripping piece 21 and the second gripping piece 22 are connected to each other via a swing member 23. Further, a lever member 24 is connected to the swing member 23 in a swingable manner. The lever member 24 is connected to the first rod member 3 via a first connecting portion 34.

When the lever member 24 is pulled by the first rod member 3, the swing member 23 swings about the first gripping piece 21. Further, when the swing member 23 swings about the first gripping piece 21, this reduces the distance between the gripping surface of the first gripping piece 21 and the gripping surface of the second gripping piece 22. In such a way, the wire W is clamped by the first gripping piece 21 and the second gripping piece 22.

In the example illustrated in FIG. 17, the first wire gripping tool 2 has a lock member 25 and an operating part 26 that operates the lock member 25. The lock member 25 restricts increase in the distance between the gripping surface of the first gripping piece 21 and the gripping surface of the second gripping piece 22. In the example illustrated in FIG. 17, the lock member 25 is attached to the lever member 24.

When the operating part 26 is operated by a remote operating tool or the like, the tip of the lock member 25 moves toward the swing member 23. The tip of the lock member 25 comes into contact with the swing member 23, and thereby the swing of the swing member 23 is restricted. In such a way, increase in the distance between the gripping surface of the first gripping piece 21 and the gripping surface of the second gripping piece 22 is restricted.

Note that, in the example illustrated in FIG. 17, the swing member 23 includes a first swing member 23a and a second swing member 23b arranged substantially parallel to the first swing member 23a. Further, a parallel link mechanism is formed by the first swing member 23a, the second swing member 23b, the first gripping piece 21, and the lever member 24. In the example illustrated in FIG. 17, although the first wire gripping tool 2 includes two swing members (23a, 23b), the number of swing members included in the first wire gripping tool 2 may be one.

In the example illustrated in FIG. 17, the first wire gripping tool 2 includes a falling-off prevention member 29 that prevents a wire arranged between the first gripping piece 21 and the second gripping piece 22 from falling off of the first wire gripping tool 2. In the example illustrated in FIG. 17, the falling-off prevention member 29 is supported by the swing member 23 (more specifically, the second swing member 23b) swingably about the first axis AT1 and supported by the second gripping piece 22 swingably about the second axis AT2.

[First Rod Member 3]

In the example illustrated in FIG. 16, the base portion 30 of the first rod member 3 is connected to the first wire gripping tool 2 via the first connecting portion 34. In the example illustrated in FIG. 16, the connection between the first rod member 3 and the first wire gripping tool 2 may be a swingable connection. More specifically, the first rod member 3 may be swingable about the axis AX1 perpendicular to the longitudinal axis AX of the first rod member 3 with respect to the first wire gripping tool 2. Note that, although the connection between the first rod member 3 and the first wire gripping tool 2 is a connection via a pin member in the example illustrated in FIG. 16, the connection between the first rod member 3 and the first wire gripping tool 2 may be a connection via a hook member.

The first rod member 3 includes the base portion 30 and the moving portion 32. The first rod member 3 can be expanded and contracted in accordance with relative movement of the moving portion 32 with respect to the base portion 30. The first rod member 3 has a connecting mechanism (a gear mechanism, a screw mechanism, or the like) that connects the base portion 30 and the moving portion 32 to each other so as to allow relative movement, and the first rod member 3 is expanded or contracted in accordance with operation of the operating part 300 provided to the base portion 30.

An example of the mechanism to expand and contract the telescopic first rod member 3 by using a remote operating tool will be described. As an example, it is assumed that (A) a first bevel gear that rotates about a rotation axis R1 together with the operating part is provided to the operating part 300, (B) a second bevel gear connected to the first bevel gear so as to be able to transfer a load is arranged inside the base portion 30, (C) the second bevel gear is rotated about the longitudinal axis AX of the first rod member 3 together with a threaded rod having external threads arranged in the outer circumference, and (D) the moving portion 32 is screwed onto the threaded rod. In such a case, when the operating part 300 is rotated about the rotation axis R1 by the remote operating member, this causes the first bevel gear to rotate about the rotation axis R1 and the second bevel gear to rotate about the longitudinal axis AX. The rotation of the second bevel gear about the longitudinal axis AX causes the threaded rod to rotate about the longitudinal axis AX. The rotation of the threaded rod about the longitudinal axis AX causes the moving portion 32 screwed onto the threaded rod to move in a direction of being pulled into the base portion 30 (or a direction of projecting out of the base portion 30). In such a way, the first rod member 3 is contracted.

[Second Wire Gripping Tool 4]

The second wire gripping tool 4 includes the first gripping piece 41 and the second gripping piece 42 and clamps the second section of the wire W by the first gripping piece 41 and the second gripping piece 42.

In the example illustrated in FIG. 16, the second wire gripping tool 4 includes a swing member 43, a lever member 44, a lock member 45, an operating part 46, and a falling-off prevention member 49. The "swing member 43", "first swing member 43a", "second swing member 43b", "lever member 44", "lock member 45", "operating part 46", and "falling-off prevention member 49" are the same member as the "swing member 23", "first swing member 23a", "second swing member 23b", "lever member 24", "lock member 25", "operating part 26", and "falling-off prevention member 29" described above, respectively. Thus, duplicated description of these members will be omitted.

[Second Rod Member 5]

In the example illustrated in FIG. 16, the base end of the second rod member 5 is connected to the second wire gripping tool 4 via a second connecting portion 54. In the example illustrated in FIG. 16, the second connecting portion 54 includes a hook member 54a attached to the second rod member 5, a closure member 54b that can close an opening of the hook member 54a, and an operating part 54c used for operating the closure member 54b. Further, by operating the operating part 54c to open the closure member 54b, it is possible to engage the second wire gripping tool 4 in the hook member 54a.

In the example illustrated in FIG. 16, the second rod member 5 and the second wire gripping tool 4 are connected to each other via the hook member 54a in a separable manner. Although the connection between the second rod member 5 and the second wire gripping tool 4 is a connection via the hook member 54a in the example illustrated in FIG. 16, the connection between the second rod member 5 and the second wire gripping tool 4 may be a connection via a pin member.

In the example illustrated in FIG. 16, the base end of the second rod member 5 (the end on the second direction DR2 side) is connected to the second wire gripping tool 4, and the tip of the second rod member 5 (the end on the first direction DR1 side) is connected to the moving portion 32 of the first rod member 3 in a separable manner via the connecting member 6.

[Second Connecting Portion 51]

In the example illustrated in FIG. 16, the second rod member 5 includes the second connecting portion 51 that connects the second rod member 5 and the load bearing member 7 to each other in a slidable manner, and the second connecting portion 51 is provided with the second load transfer surface 51t.

It is preferable that the second connecting portion 51 have the through hole 51h that accepts a first rod-like portion 70a of the load bearing member 7 and a through hole 51k that accepts a second rod-like portion 70b of the load bearing member 7.

[Load Bearing Member 7]

In the example illustrated in FIG. 16, the load bearing member 7 includes the first rod-like portion 70a and a second rod-like portion 70b parallel to the first rod-like portion 70a. Further, the first rod-like portion 70a and the second rod-like portion 70b are arranged parallel to the longitudinal axis AX of the first rod member 3.

When the load bearing member 7 includes the first rod-like portion 70a and the second rod-like portion 70b, the bending rigidity of the load bearing member 7 is improved. Further, when the load bearing member 7 includes the first rod-like portion 70a and the second rod-like portion 70b, the tensile load acting on the first wire gripping tool 2 and the second wire gripping tool 4 is supported by the first rod-like portion 70a and the second rod-like portion 70b in a distributed manner. Therefore, safety and reliability of the wire operating tool 1B are improved.

In the example illustrated in FIG. 16, the tip of the first rod member 3 (in other words, the portion connected to the second rod member 5) and the tip of the second rod member 5 (in other words, the portion connected to the first rod member 3) are interposed between the first rod-like portion 70a and the second rod-like portion 70b. Thus, the tip of the first rod member 3 and the tip of the second rod member 5 are protected by the first rod-like portion 70a and the second rod-like portion 70b.

Note that, although the load bearing member 7 has two rod-like portions (70a, 70b) in the example illustrated in FIG. 16, the load bearing member 7 may have one or three or more rod-like portions.

[First Connecting Portion 71]

In the example illustrated in FIG. 16, the load bearing member 7 includes the first connecting portion 71 that connects the load bearing member 7 to the second rod member 5 in a slidable manner, and the first connecting portion 71 is provided with the first load transfer surface 71t.

The first rod-like portion 70a and the second rod-like portion 70b are fixed to the first connecting portion 71. Further, it is preferable that the first connecting portion 71 have the through hole 71h that accepts the second rod member 5 in a slidable manner.

[Fixing Tool 8]

The fixing tool 8 is a member that fixes a wire such as the first wire W1 (or the connecting sleeve SV). The fixing tool 8 includes a first gripping piece 81, a second gripping piece 82, and a fixing tool operating part 83. Further, the fixing tool 8 has a connecting portion 80, and the connecting portion 80 is connected to the moving portion 32 of the first rod member 3 in a slidable manner. Alternatively, the connecting portion 80 may be fixed to the moving portion 32 of the first rod member 3.

In the example illustrated in FIG. 16, the connecting portion 80 has a through hole that accepts the moving portion 32 of the first rod member 3, a through hole that accepts the first rod-like portion 70a of the load bearing member 7 in a slidable manner, and a through hole that accepts the second rod-like portion 70b of the load bearing member 7 in a slidable manner.

Further, in the example illustrated in FIG. 16, the fixing tool 8 (more specifically, the connecting portion 80) has a pressed portion 80a that can come into contact with the pressing portion 32a of the moving portion 32. The pressing portion 32a of the moving portion 32 and the pressed portion 80a of the fixing tool 8 can come into contact with each other and can be spaced apart from each other. Further, the pressed portion 80a of the fixing tool 8 is pressed by the pressing portion 32a of the moving portion 32, and thereby the fixing tool 8 can move in the first direction DR1 together with the moving portion 32 of the first rod member 3.

[Wire Support Tool 9]

In the example illustrated in FIG. 16, the wire operating tool 1B includes the wire support tool 9. The wire support tool 9 may include the first wire support tool 9a and the second wire support tool 9b.

The first wire support tool 9a is supported by (that is, fixed to) the first rod member 3 (more specifically, the base portion 30 of the first rod member 3). The first wire support tool 9a can support the wire W.

The position of the first wire support tool 9a may be changed along the longitudinal direction of the first rod member 3 (more specifically, the base portion 30 of the first rod member 3). In such a case, the first wire support tool 9a has a through hole that accepts the first rod member 3 (more specifically, the base portion 30 of the first rod member 3) in a slidable manner and a tightening member (such as a fixing screw) used for fixing the first wire support tool 9a to the first rod member 3.

When the wire operating tool 1B has the first wire support tool 9a, the first cut end Wa of the first wire W1 is suitably positioned by the first wire support tool 9a after the wire W is cut. Further, the looseness (flection) of the first wire W1 is suppressed after the wire W is cut.

In the example illustrated in FIG. 16, the first wire support tool 9a has a receiving space SP1 that accepts the wire W. In the example illustrated in FIG. 16, the first wire support tool 9a has a frame member 91a, a closure member 92a that can open and close the opening of the frame member 91a, and an operating part 93a used for operating the closure member 92a. In the example illustrated in FIG. 16, the receiving space SP1 is defined by the frame member 91a and the closure member 92a. When the wire W is inserted in the receiving space SP1, the closure member 92a is opened in accordance with operation of the operating part 93a, for example. The wire W is then inserted in the receiving space SP1 via the opening of the frame member 91a.

In the example illustrated in FIG. 16, the first wire support tool 9a is attached to the first rod member (more specifically, the base portion 30 of the first rod member 3) so as to be rotatable about the longitudinal axis AX of the first rod member 3. Alternatively or additionally, the second wire support tool 9b may be attached to the second rod member 5 so as to be rotatable about the longitudinal axis of the second rod member 5.

The second wire support tool 9b is supported by (that is, fixed to) the second rod member 5. The second wire support tool 9b can support the wire W.

The position of the second wire support tool 9b may be changed along the longitudinal direction of the second rod member 5. In such a case, the second wire support tool 9b has a through hole that accepts the second rod member 5 in a slidable manner and a tightening member (such as a fixing screw) used for fixing the second wire support tool 9b to the second rod member 5.

When the wire operating tool 1B has the second wire support tool 9b, the second cut end Wb of the second wire W2 is suitably positioned by the second wire support tool 9b after the wire W is cut. Further, the looseness (flection) of the second wire W2 is suppressed after the wire W is cut.

In the example illustrated in FIG. 16, the second wire support tool 9b has a receiving space SP2 that accepts the wire W. In the example illustrated in FIG. 16, the second wire support tool 9b has a frame member 91b, a closure member 92b that can open and close the opening of the frame member 91b, and an operating part 93b used for operating the closure member 92b. In the example illustrated in FIG. 16, the receiving space SP2 is defined by the frame member 91b and the closure member 92b. When the wire W is inserted in the receiving space SP2, the closure member 92b is opened in accordance with operation of the operating part 93b, for example. The wire W is then inserted in the receiving space SP2 via the opening of the frame member 91b.

[Wire Cutting and Dividing Method]

Figure 18:
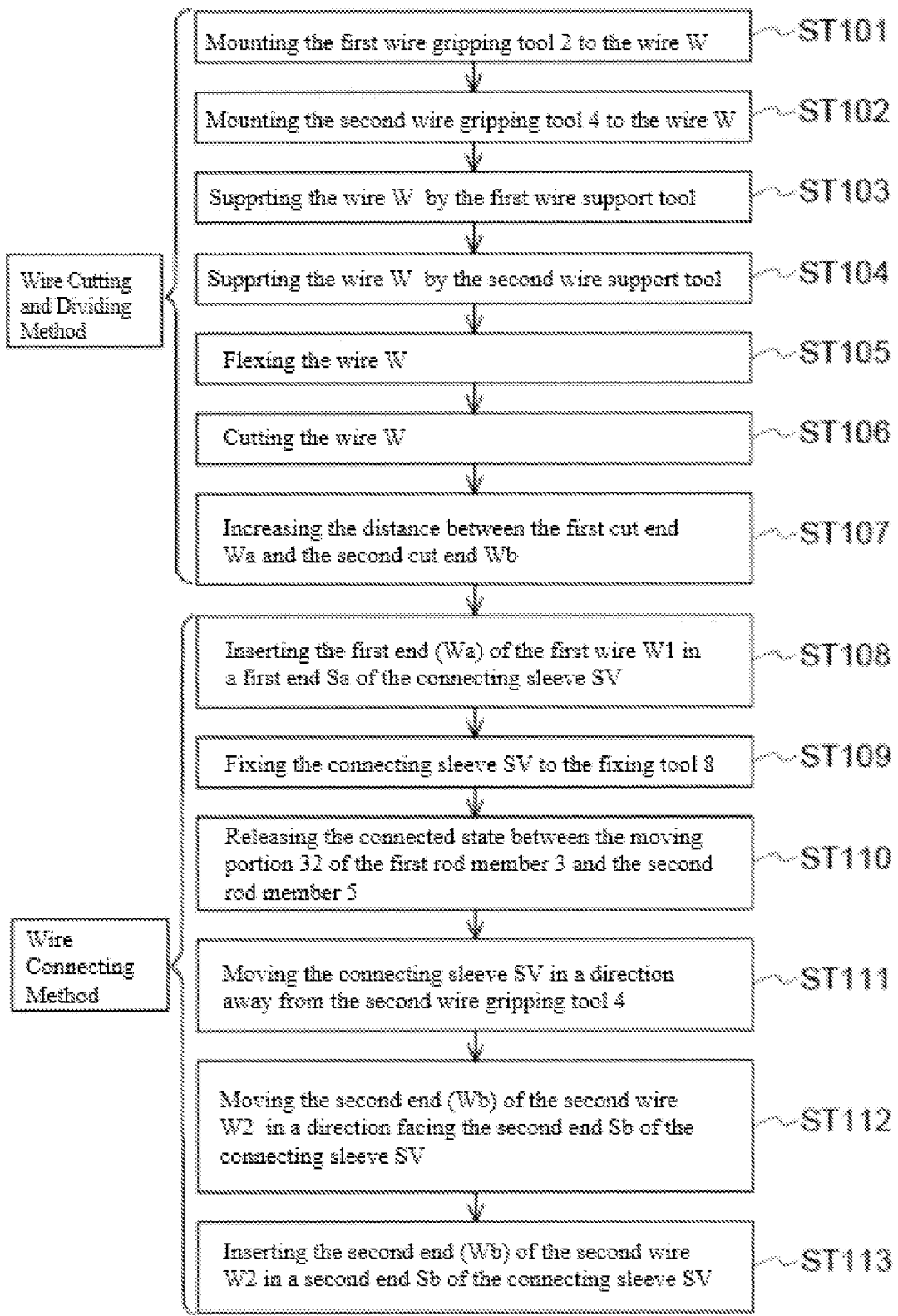
FIG. 18 is a flowchart illustrating an example of a wire cutting and dividing method and a wire connecting method in the second embodiment.
Figure 19:
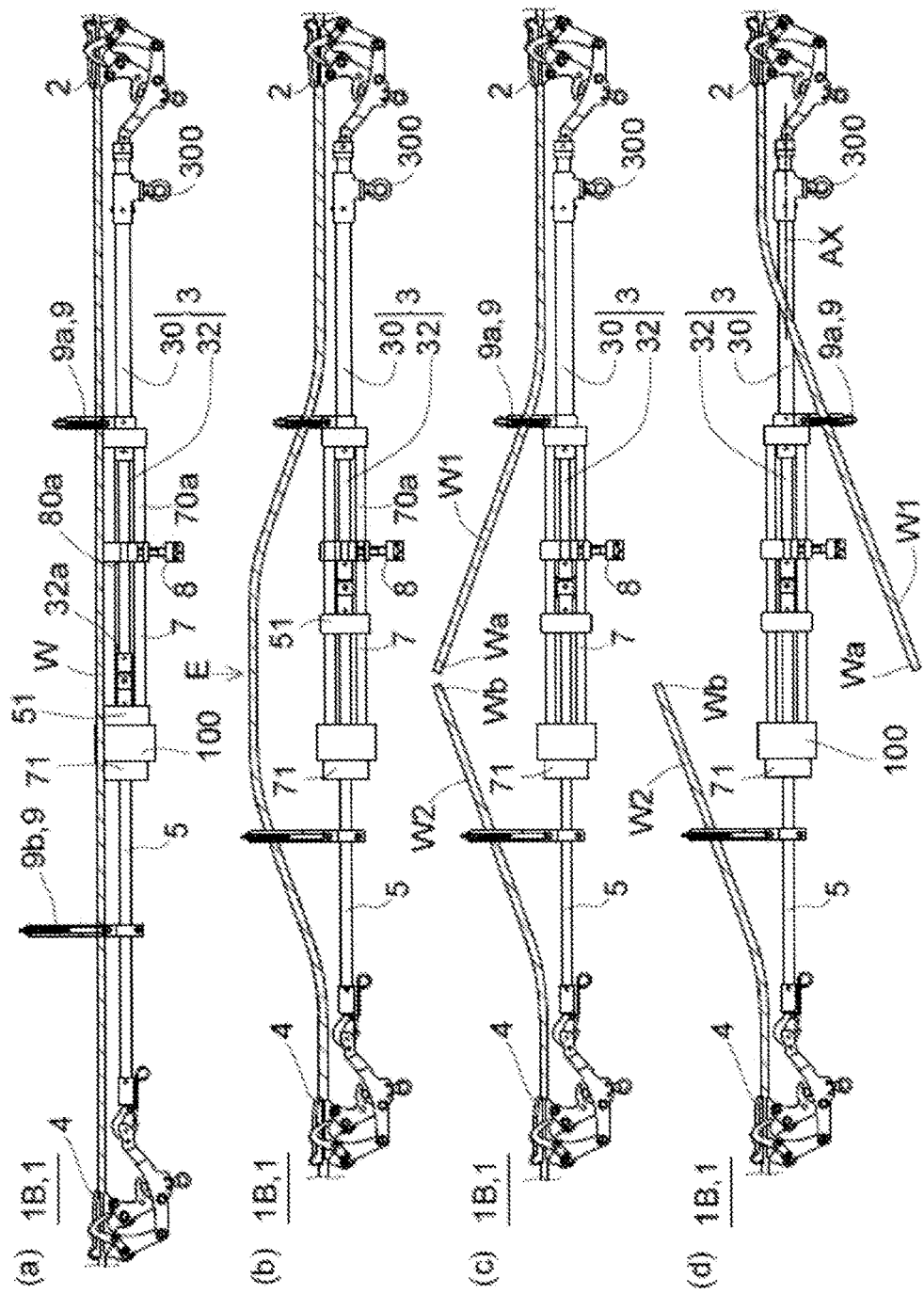
FIG. 19 illustrates diagrams schematically illustrating respective steps of the wire cutting and dividing method in the second embodiment.

The electric wire cutting and dividing method in the second embodiment will be described with reference to FIG. 18 and FIG. 19. FIG. 18 is a flowchart illustrating an example of the wire cutting and dividing method in the second embodiment. FIG. 19 illustrates diagrams schematically illustrating respective steps of the wire cutting and dividing method in the second embodiment.

The wire cutting and dividing method in the second embodiment is performed by using the wire operating tool 1. The wire operating tool 1 used in the wire cutting and dividing method in the second embodiment may be the wire operating tool 1B in the second embodiment or may be other wire operating tools.

In the first step ST101, the first wire gripping tool 2 is mounted to the wire W. In the second step ST102, the second wire gripping tool 4 is mounted to the wire W. Note that the second step ST102 may be performed after the first step ST101 or may be performed before the second step ST102.

In the third step ST103, the wire W is supported by the first wire support tool 9a. Note that supporting the wire W by the first wire support tool 9a may mean arranging the wire W inside the receiving space SP1 of the first wire support tool 9a or may mean fixing the wire W to the first wire support tool 9a. When the wire operating tool 1 does not have the first wire support tool 9a, the third step ST103 is omitted.

In the fourth step ST104, the wire W is supported by the second wire support tool 9b. Note that supporting the wire W by the second wire support tool 9b may mean arranging the wire W inside the receiving space SP2 of the second wire support tool 9b or may mean fixing the wire W to the second wire support tool 9b. When the wire operating tool 1 does not have the second wire support tool 9b, the fourth step ST104 is omitted.

FIG. 19(a) illustrates a state of the wire operating tool 1 after the first step ST101 to the fourth step ST104 have been performed. Note that in the state where the first step ST101 to the fourth step ST104 have been performed, the wire W has not been fixed to the fixing tool 8. Further, it is preferable that the stopper member 100 be arranged between the first connecting portion 71 and the second connecting portion 51 in the state where the first step ST101 and the second step ST102 have been performed.

The third step ST103 and the fourth step ST104 may be performed before the first step ST101 and the second step ST102 or may be performed after the first step ST101 and the second step ST102.

In the fifth step ST105, the distance between the first wire gripping tool 2 and the second wire gripping tool 4 is reduced to flex the wire W (see FIG. 19(b)).

The fifth step ST105 can be performed by operating the operating part 300 to contract the first rod member 3. Note that the fifth step ST105 (in other words, the step of flexing the wire W) is performed in the connected state where the moving portion 32 of the first rod member 3 and the second rod member 5 are connected to each other.

In the sixth step ST106, the wire W is cut at the position between the first wire gripping tool 2 and the second wire gripping tool 4, more specifically, a position between the first wire support tool 9a and the second wire support tool 9b (for example, the position indicated by the arrow E in FIG. 19(b)). Because of cutting of the wire W, the first cut end Wa and the second cut end Wb are formed in the wire W (see FIG. 19(c)).

In the seventh step ST107, the distance between the first cut end Wa and the second cut end Wb is increased. FIG. 19(d) illustrates a state of the wire operating tool 1 after the seventh step ST107 has been performed.

The step of increasing the distance between the first cut end Wa and the second cut end Wb is performed by rotating the first wire support tool 9a, which supports the first wire W1 having the first cut end Wa, or the second wire support tool 9b, which supports the second wire W2 having the second cut end Wb, about the longitudinal axis of the first rod member 3 or the second rod member 5, for example. In the example illustrated in FIG. 19(d), the distance between the first cut end Wa and the second cut end Wb is increased by rotation of the first wire support tool 9a about the longitudinal axis AX of the first rod member 3.

Note that the seventh step ST107 (in other words, the step of increasing the distance between the first cut end Wa and the second cut end Wb) may include increasing the distance between the first cut end Wa and the second cut end Wb by expanding the first rod member 3, as illustrated in FIG. 20(a) as an example. The expansion of the first rod member 3 is performed by moving the moving portion 32 relative to the base portion 30 in the connected state where the moving portion 32 of the first rod member 3 and the second rod member 5 are connected to each other. Additionally, in the seventh step ST107, the stopper member 100 may be removed between the first connecting portion 71 and the second connecting portion 51.

In the second embodiment, the wire W can be flexed by contracting the first rod member 3 (fifth step ST105). Further, in the second embodiment, it is possible to increase the distance between the first cut end Wa and the second cut end Wb with simple work or operation (seventh step ST107). Thus, the use of the wire operating tool 1B in the second embodiment and/or the wire cutting and dividing method in the second embodiment enables safe and efficient cutting and dividing work of the wire W to be implemented. Further, the workload on the worker performing cutting and dividing work of the wire W is reduced.

[Wire Connecting Method]

Figure 20:
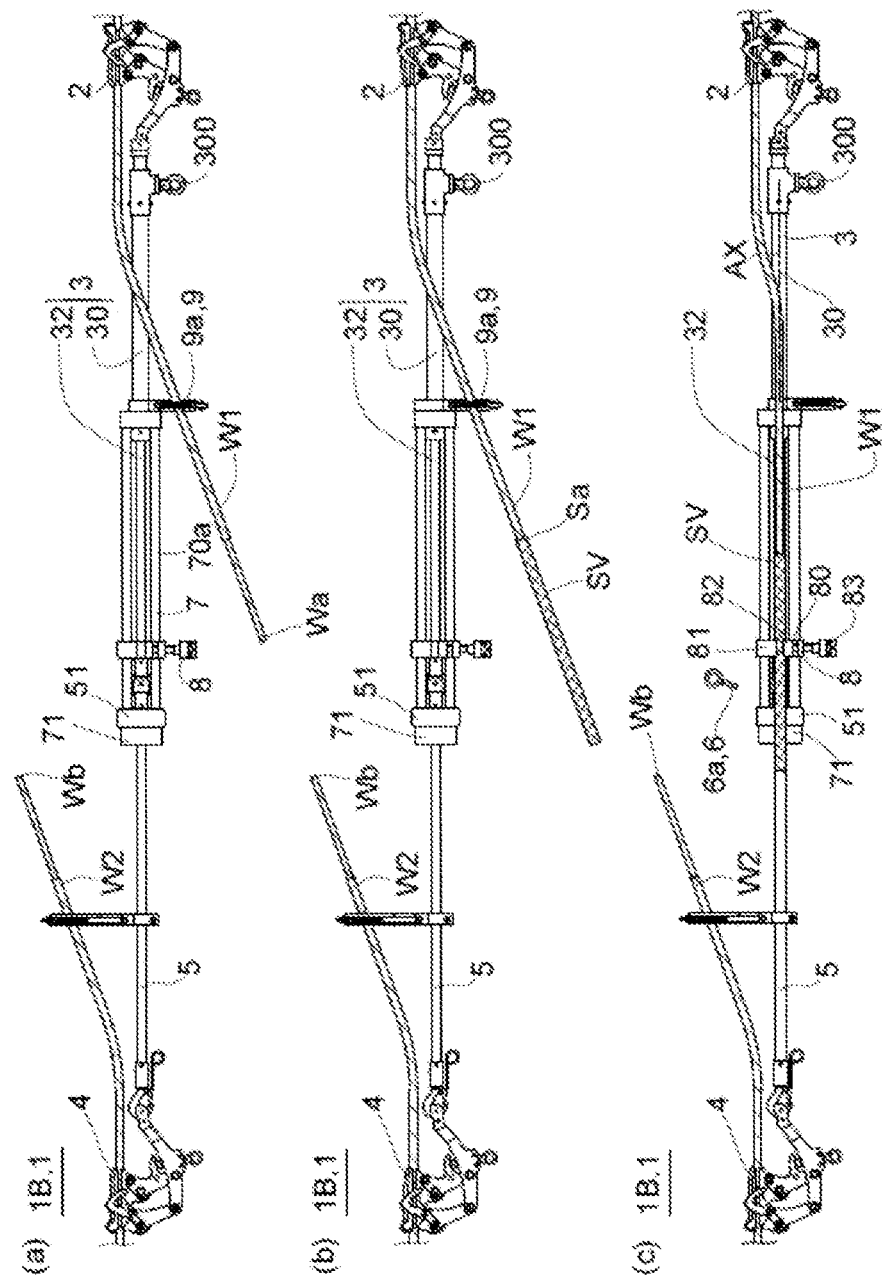
FIG. 20 illustrates diagrams schematically illustrating respective steps of the wire connecting method in the second embodiment.
Figure 21:
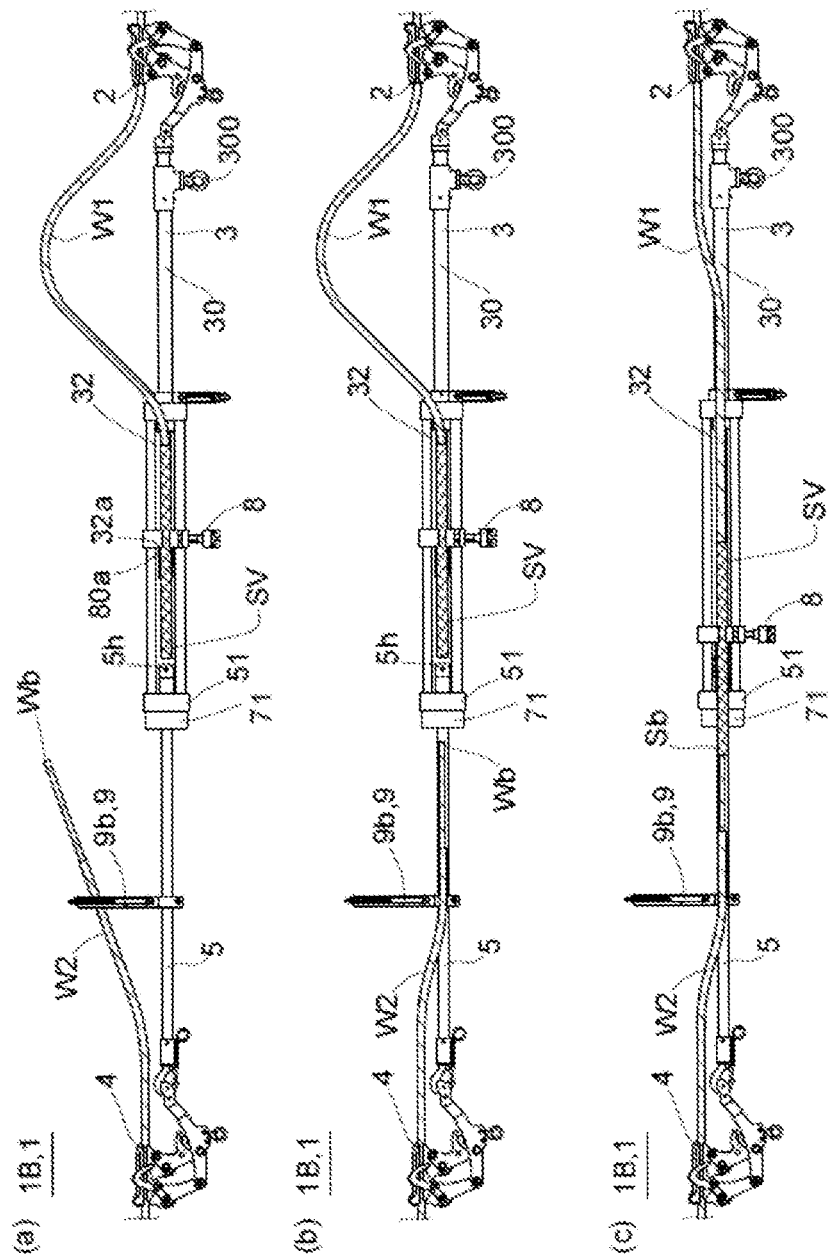
FIG. 21 illustrates diagrams schematically illustrating respective steps of the wire connecting method in the second embodiment.
Figure 22:
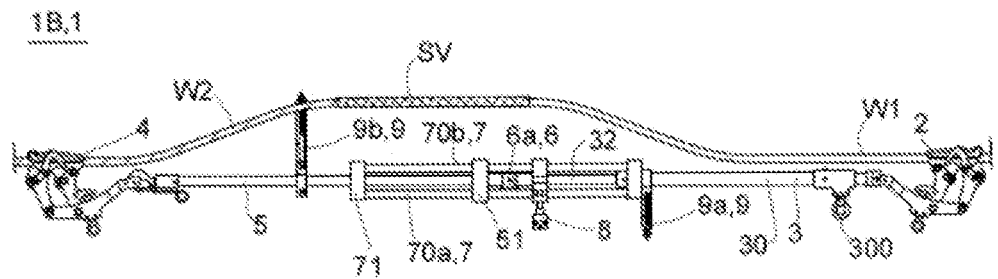
FIG. 22 is a diagram schematically illustrating one step of the wire connecting method in the second embodiment.

The wire connecting method in the second embodiment will be described with reference to FIG. 18 and FIG. 20 to FIG. 22. FIG. 18 is a flowchart illustrating an example of the wire connecting method in the second embodiment. FIG. 20 to FIG. 22 are diagrams each schematically illustrating respective steps of the wire connecting method in the second embodiment.

The wire connecting method in the second embodiment is performed by using the wire operating tool 1. The wire operating tool 1 used in the wire connecting method in the second embodiment may be the wire operating tool 1B in the second embodiment or may be other wire operating tools.

When the "wire" is an "electric wire", it is assumed that the insulating sheath has been removed from the first end of the first wire W1 (first cut end Wa) and the second end of the second wire W2 (second cut end Wb) before the wire connecting method (in other words, the electric wire connecting method) is performed, and the core wires of the wire W (that is, the electric wire) are exposed at the first end (Wa) and the second end (Wb) (see FIG. 20(a)).

In the eighth step ST108, the first end (Wa) of the first wire W1 gripped by the first wire gripping tool 2 is inserted in the first end Sa of the connecting sleeve SV (see FIG. 20(b)). Note that the eighth step ST108 is performed after the seventh step ST107 of the wire cutting and dividing method described above, for example.

The eighth step ST108 is performed by using any remote operating tool to insert the first end (Wa) of the first wire W1 in the first end Sa of the connecting sleeve SV, for example.

In the ninth step ST109, the connecting sleeve SV is fixed to the fixing tool 8 (see FIG. 20(c)). For example, the step of fixing the connecting sleeve SV to the fixing tool 8 is performed by operating the fixing tool operating part 83 to reduce the distance between the first gripping piece 81 and the second gripping piece 82. Although it is preferable that the ninth step ST109 be performed after the eighth step ST108 has been performed, the ninth step ST109 may be performed before the eighth step ST108 is performed.

Note that, when the position of the fixing tool 8 can be changed along the longitudinal axis AX of the first rod member 3 with respect to the moving portion 32, the position of the fixing tool 8 relative to the moving portion 32 may be adjusted (in other words, the position of the fixing tool 8 relative to the moving portion 32 may be changed) before the ninth step ST109 is performed.

In the tenth step ST110, the connected state between the moving portion 32 of the first rod member 3 and the second rod member 5 (more specifically, the connected state via the connecting member 6) is released (see FIG. 20(c)). Such release of the connected state is performed by pulling the connecting member 6 (for example, the pin member 6a) from at least one of the moving portion 32 of the first rod member 3 and the second rod member 5, for example. Note that it is preferable that release of a connected state between the moving portion 32 of the first rod member 3 and the second rod member 5 be performed in a state where the first connecting portion 71 and the second connecting portion 51 are in contact with each other.

Such release of the connected state may be performed before the ninth step ST109 or may be performed after the ninth step ST109. Further, the release of the connected state may be performed before the eighth step ST108 or may be performed after the eighth step ST108.

In the eleventh step ST111, the fixing tool 8 and the connecting sleeve SV fixed to the fixing tool 8 are moved in a direction away from the second wire gripping tool 4 (see FIG. 21(a)). This movement is performed by moving the moving portion 32 relative to the base portion 30 in a separate state where the moving portion 32 of the first rod member 3 and the second rod member 5 are separated from each other. More specifically, when the moving portion 32 is moved toward the base portion 30, the pressing portion 32a of the moving portion 32 presses the pressed portion 80a of the fixing tool 8. As a result, the fixing tool 8 moves in a direction toward the base portion 30 (in other words, the direction away from the second wire gripping tool 4).

In the twelfth step ST112, the second end (Wb) of the second wire W2 gripped by the second wire gripping tool 4 is moved in a direction facing the second end Sb of the connecting sleeve SV (see FIG. 21(b)). Such movement is performed by using any remote operating tool, for example. The twelfth step ST112 may include detaching the second wire W2 from the second wire support tool 9b (more specifically, moving the second wire W2 out of the receiving space SP2 of the second wire support tool 9b).

In the thirteenth step ST113, the second end (Wb) of the second wire W2 gripped by the second wire gripping tool 4 is inserted in the second end Sb of the connecting sleeve SV (see FIG. 21(c)). The thirteenth step ST113 includes moving the fixing tool 8 and the connecting sleeve SV fixed to the fixing tool 8 toward the second wire gripping tool 4. Such movement may include sliding the fixing tool 8 with respect to the moving portion 32 of the first rod member 3 by using a remote operating tool or the like. Alternatively, when the fixing tool 8 is fixed to the moving portion 32 of the first rod member 3, such movement may be performed by expanding the first rod member 3, in other words, moving the moving portion 32 relative to the base portion 30.

After the thirteenth step ST113 is performed, when the amount of insertion of the first end (Wa) of the first wire W1 and/or the second end (Wb) of the second wire W2 into the connecting sleeve SV is insufficient, the insertion of the first end (Wa) of the first wire W1 and/or the second end (Wb) of the second wire W2 into the connecting sleeve SV may be facilitated by reducing the distance between the first wire gripping tool 2 and the second wire gripping tool 4 (see FIG. 22). The reduction of the distance between the first wire gripping tool 2 and the second wire gripping tool 4 can be performed by contracting the first rod member 3 after connecting the moving portion 32 of the first rod member 3 and the second rod member 5 to each other by using the connecting member 6. Note that the connection between the moving portion 32 of the first rod member 3 and the second rod member 5 is performed by inserting the pin member 6a in both the moving portion 32 and the second rod member 5, for example.

With the steps described above, the first end (Wa) of the first wire W1 and the second end (Wb) of the second wire W2 are connected to each other via the connecting sleeve SV. Note that, after the thirteenth step ST113, the connecting sleeve SV may be crimped, the connecting sleeve SV and the first end (Wa) may be crimped together, and the connecting sleeve SV and the second end (Wb) may be crimped together.

In the wire connecting method in the second embodiment, it is possible to insert the end of the first wire W1 in the first end Sa of the connecting sleeve SV with simple work (eighth step ST108). Further, when inserting the end of the first wire W1 in the connecting sleeve SV, the worker is not required to take any uncomfortable posture or difficult action. This enables the worker to perform wire connecting work safely and efficiently.

In the wire connecting method in the second embodiment, it is possible to insert the end of the second wire W2 in the second end Sb of the connecting sleeve SV with simple work or operation (thirteenth step ST113). Further, when inserting the end of the second wire W2 in the connecting sleeve SV, the worker is not required to take any uncomfortable posture or difficult action. This enables the worker to perform wire connecting work safely and efficiently.

Modified Example of Second Embodiment

Figure 23:
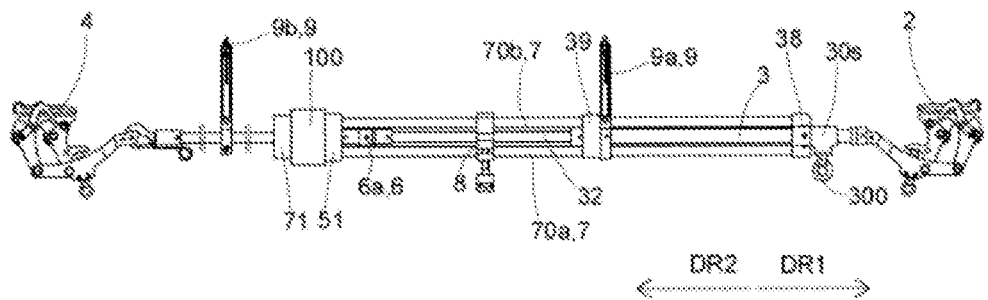
FIG. 23 is a schematic side view of a wire operating tool in a modified example of the second embodiment.

In the example illustrated in FIG. 16, the example in which the load bearing member 7 (more specifically, the first rod-like portion 70a and the second rod-like portion 70b) is fixed to the base portion 30 of the first rod member 3 via the connecting block 39 has been described. In the example illustrated in FIG. 16, the end on the first direction DR1 side of the load bearing member 7 is fixed to the connecting block 39. Alternatively, as illustrated in FIG. 23 as an example, the load bearing member 7 may extend so as to pass through the connecting block 39, and the end on the first direction DR1 side of the load bearing member 7 (more specifically, the first rod-like portion 70a and the second rod-like portion 70b) may be fixed to a second connecting block 38. In the example illustrated in FIG. 23, the second connecting block 38 is attached to a base end portion 30s of the base portion 30 where the operating part 300 is arranged. Alternatively, the second connecting block 38 may be formed integrally with the base end portion 30s.

Figure 24:
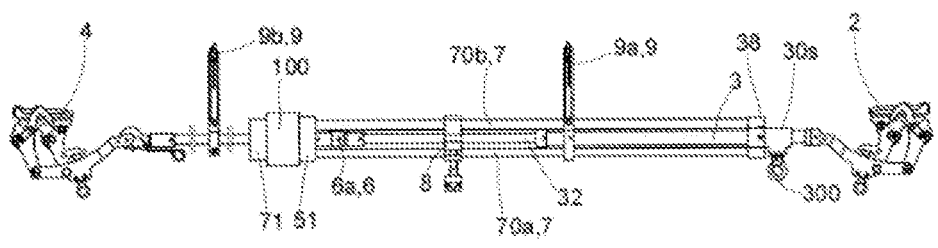
FIG. 24 is a schematic side view of a wire operating tool in another modified example of the second embodiment.

Further and alternatively, as illustrated in FIG. 24 as an example, when the end on the first direction DR1 side of the load bearing member 7 (more specifically, the first rod-like portion 70a and the second rod-like portion 70b) is fixed to the second connecting block 38, the connecting block 39 (see FIG. 23) may be omitted.

Third Embodiment

Figure 25:
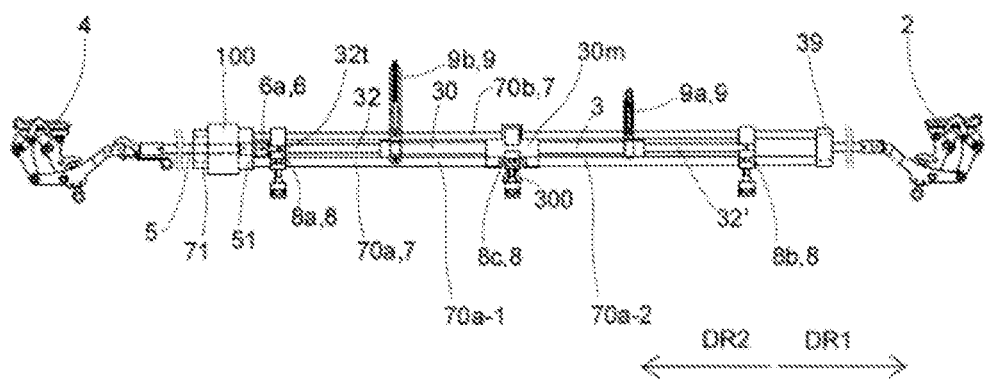
FIG. 25 is a schematic side view of a wire operating tool in a third embodiment.
Figure 26:
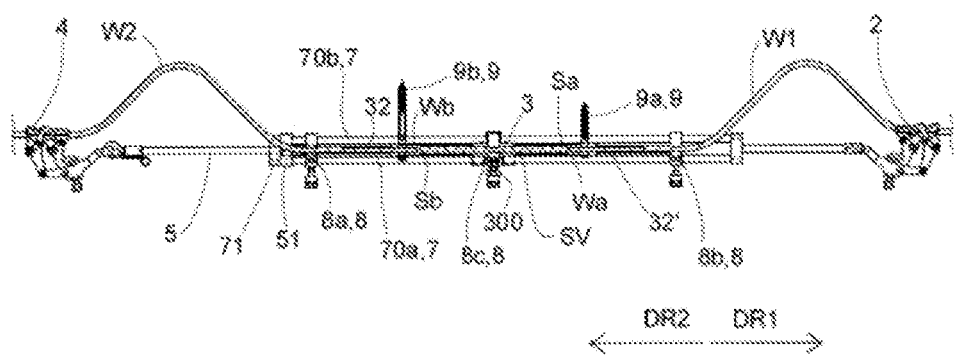
FIG. 26 is a schematic side view of the wire operating tool in the third embodiment.

A wire operating tool 1C in the third embodiment will be described with reference to FIG. 25 and FIG. 26. FIG. 25 and FIG. 26 are schematic side views of the wire operating tool 1C in the third embodiment.

In the third embodiment, features different from those of the first embodiment and the second embodiment will be mainly described, and duplicated description for subjects that have already been described in the first embodiment or the second embodiment will be omitted. It is therefore obvious that, even though not explicitly described in the third embodiment, the subjects that have already been described in the first embodiment or the second embodiment can be employed in the third embodiment.

The wire operating tool 1C of the third embodiment differs from the wire operating tool 1A of the first embodiment (or the wire operating tool 1B of the second embodiment) in that the first rod member 3 has a second moving portion 32' that moves in the second direction DR2, which is the opposite direction to the first direction DR1, when the moving portion 32 moves in the first direction DR1.

In the example illustrated in FIG. 25, the first rod member 3 includes the moving portion 32, the base portion 30, and the second moving portion 32'. For example, the base portion 30 is fixed to the load bearing member 7 (more specifically, the first rod-like portion 70a and/or the second rod-like portion 70b).

In the example illustrated in FIG. 25, the base portion 30 has the operating part 300. The first rod member 3 is expanded and contracted in accordance with operation of the operating part 300 provided to the base portion 30. The operating part 300 is operated by using a remote operating tool, for example. The mechanism that the moving portion 32 moves in the first direction DR1 (or the second direction DR2) with respect to the base portion 30 in accordance with the operation of the operating part 300 has already been described in the first embodiment and the second embodiment. Thus, duplicated description of the mechanism that the moving portion 32 moves will be omitted. In the example illustrated in FIG. 25, the second moving portion 32' moves in the second direction DR2 (or the first direction DR1) with respect to the base portion 30 in accordance with operation of the operating part 300. The mechanism that the second moving portion 32' moves in the second direction DR2 (or the first direction DR1) with respect to the base portion 30 is the same as the mechanism that the moving portion 32 moves in the first direction DR1 (or the second direction DR2) with respect to the base portion 30.

Note that the first rod member 3 may include a threaded portion and a reverse threaded portion in order to cause the second moving portion 32' to move in the second direction DR2 with respect to the base portion 30 when the moving portion 32 moves in the first direction DR1 with respect to the base portion 30 (otherwise, in order to cause the second moving portion 32' to move in the first direction DR1 with respect to the base portion when the moving portion 32 moves in the second direction DR2 with respect to the base portion 30). In such a case, when the threaded portion drives the moving portion 32 in the first direction DR1, the reverse threaded portion drives the second moving portion 32' in the second direction DR2.

In the example illustrated in FIG. 25, the fixing tool 8 (more specifically, a first fixing tool 8a) is arranged to the moving portion 32, and the fixing tool (more specifically, a second fixing tool 8b) is arranged to the second moving portion 32'. Although the first fixing tool 8a is fixed to the moving portion 32 in the example illustrated in FIG. 25, the first fixing tool 8a may be slidable with respect to the moving portion 32. Similarly, although the second fixing tool 8b is fixed to the second moving portion 32' in the example illustrated in FIG. 25, the second fixing tool 8b may be slidable with respect to the second moving portion 32'. The second wire W2 having the second cut end Wb is fixed to the first fixing tool 8a, for example, and the first wire W1 having the first cut end Wa is fixed to the second fixing tool 8b, for example. Although the first fixing tool 8a is fixed to the tip 32t of the moving portion 32 in the example illustrated in FIG. 25, the first fixing tool 8a may be fixed to the middle part of the moving portion 32. Although the second fixing tool 8b is fixed to the tip of the second moving portion 32' in the example illustrated in FIG. 25, the second fixing tool 8b may be fixed to the middle part of the second moving portion 32'.

In the example illustrated in FIG. 25, the fixing tool 8 (more specifically, a third fixing tool 8c) is arranged to the base portion 30. Although the third fixing tool 8c is fixed to the base portion 30 in the example illustrated in FIG. 25, the third fixing tool 8c may be fixed to the load bearing member 7 (more specifically, the first rod-like portion 70a and/or the second rod-like portion 70b). For example, the connecting sleeve SV is fixed to the third fixing tool 8c.

In the example illustrated in FIG. 25, the first rod-like portion 70a includes the first portion 70a-1 and the second portion 70a-2. Further, the end on the first direction DR1 side of the first portion 70a-1 is connected to the base portion 30 (more specifically, in the base portion 30, a base portion middle part 30m where the operating part 300 is arranged), and the end on the second direction DR2 side of the second portion 70a-2 is connected to the base portion 30 (more specifically, in the base portion 30, the base portion middle part 30m where the operating part 300 is arranged). Although the first rod-like portion 70a includes two rod-like components (more specifically, the first portion 70a-1 that is a rod-like component and the second portion 70a-2 that is a rod-like component) arranged on a straight line in the example illustrated in FIG. 25, the first rod-like portion 70a may be formed of a single rod-like component. Similarly, the second rod-like portion 70b may be formed of two rod-like components arranged on a straight line or may be a single rod-like component.

In the example illustrated in FIG. 25, each of the first fixing tool 8a, the second fixing tool 8b, and the third fixing tool 8c may have the same structure as the fixing tool 8 illustrated in FIG. 1(a) as an example. In other words, each of the first fixing tool 8a, the second fixing tool 8b, and the third fixing tool 8c may have the connecting portion 80, the first gripping piece 81, the second gripping piece 82, and the fixing tool operating part 83.

An example of the wire cutting and dividing method in the third embodiment will be described. In the wire cutting and dividing method in the third embodiment, first, the first wire gripping tool 2 is mounted to the wire W, and the second wire gripping tool 4 is mounted to the wire W. Before or after the wire gripping tools (2, 4) are mounted to the wire, the wire W may be supported by the first wire support tool 9a and/or the second wire support tool 9b. Second, the first rod member 3 is contracted to flex the wire W. Contracting the first rod member 3 includes moving the moving portion 32 in the first direction DR1 and, at the same time, moving the second moving portion 32' in the second direction DR2. The contraction of the first rod member 3 is performed in the connected state where the moving portion 32 of the first rod member 3 and the second rod member 5 are connected to each other. Third, the wire W is cut at a position between the first wire gripping tool 2 and the second wire gripping tool 4. Because of such cutting, the first cut end Wa and the second cut end Wb are formed. Fourth, the distance between the first cut end Wa and the second cut end Wb is increased. Such increase of the distance is performed by rotating the first wire support tool 9a or the second wire support tool 9b about the longitudinal axis of the first rod member 3, for example.

An example of the wire connecting method in the third embodiment will be described. In the wire connecting method in the third embodiment, first, the connecting sleeve SV is fixed to the third fixing tool 8c. The first wire W1 is fixed to the second fixing tool 8b before or after the connecting sleeve SV is fixed to the third fixing tool 8c. Further, the second wire W2 is fixed to the first fixing tool 8a before or after the connecting sleeve SV is fixed to the third fixing tool 8c. FIG. 26 illustrates a state where the connecting sleeve SV has been fixed to the third fixing tool 8c, the first wire W1 has been fixed to the second fixing tool 8b, and the second wire W2 has been fixed to the first fixing tool 8a. Second, the first end (Wa) of the first wire W1 gripped by the first wire gripping tool 2 is inserted in the first end Sa of the connecting sleeve SV, and the second end (Wb) of the second wire W2 gripped by the second wire gripping tool 4 is inserted in the second end Sb of the connecting sleeve SV. The insertion of the first end (Wa) of the first wire W1 and the second end (Wb) of the second wire W2 into the connecting sleeve SV is performed by contracting the first rod member 3, for example. Contracting the first rod member 3 includes moving the moving portion 32 in the first direction DR1 and, at the same time, moving the second moving portion 32' in the second direction DR2. The contraction of the first rod member 3 is performed in a state where the connection between the moving portion 32 of the first rod member 3 and the second rod member 5 is released (more specifically, a state where the connecting member 6 does not connect the moving portion 32 of the first rod member 3 and the second rod member 5 to each other). In the example illustrated in FIG. 26, the first fixing tool 8a is fixed to the moving portion 32, and the second fixing tool 8b is fixed to the second moving portion 32'. Thus, when the moving portion 32 moves in the first direction DR1, this causes the second end (Wb) of the second wire W2 fixed to the first fixing tool 8a to move in the first direction DR1. As a result, the second end (Wb) is inserted in the connecting sleeve SV. Similarly, when the second moving portion 32' moves in the second direction DR2, this causes the first end (Wa) of the first wire W1 fixed to the second fixing tool 8b to move in the second direction DR2. As a result, the first end (Wa) is inserted in the connecting sleeve SV. After the first end (Wa) of the first wire W1 and the second end (Wb) of the second wire W2 have been inserted in the connecting sleeve SV, the connecting sleeve SV may be crimped.

The third embodiment provides the same advantageous effects as the first embodiment or the second embodiment. Further, in the third embodiment, the first rod member 3 of the wire operating tool 1C includes the moving portion 32 and the second moving portion 32'. In such a case, it is possible to operate the first end (Wa) of the first wire W1 and the second end (Wb) of the second wire W2 at the same time (for example, to insert the first end (Wa) and the second end (Wb) in the connecting sleeve SV at the same time).

[Component for Wire Operating Tool]

In the wire operating tool 1 of the embodiments described above, components of existing wire cutting and dividing tools can be used for the first wire gripping tool 2, the second wire gripping tool 4, the base portion 30 of the first rod member 3, and the wire support tool 9 without change. That is, in the embodiments described above, existing components may be used for the first wire gripping tool 2, the second wire gripping tool 4, the base portion 30 of the first rod member 3, and the wire support tool 9, and newly provided components may be used for a moving member (32) forming a part of the first rod member 3 (in other words, one or more moving members that can move relative to the base portion 30 of the first rod member 3), the second rod member 5, the connecting member 6 that connects the moving member (32) and the second rod member 5 to each other in a separable manner, and the load bearing member 7. Naturally, at least one of the first wire gripping tool 2, the second wire gripping tool 4, the base portion 30 of the first rod member 3, the wire support tool 9, and the fixing tool 8 may be formed of a newly provided component instead of an existing component.

Note that the present invention is not limited to the embodiments described above. Any combination of some of the embodiments described above or otherwise a modification of any component or omission of any component of each of the embodiments is possible within the scope of the present invention. Moreover, any component may be added to each of the embodiments described above.

Figure 27:
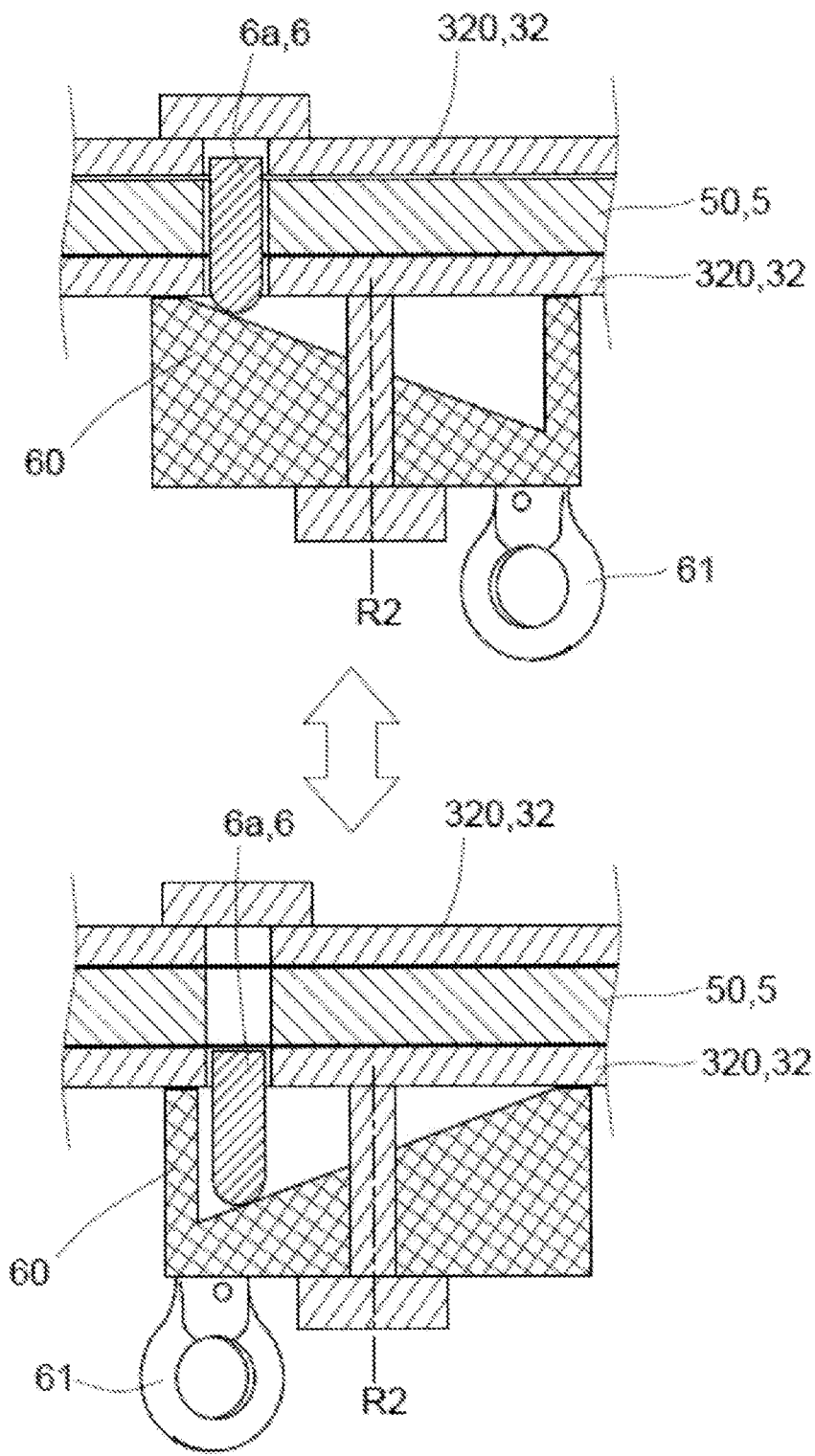
FIG. 27 is a diagram schematically illustrating a view when a connecting member is operated by a cam member.

For example, FIG. 2 illustrates the example in which the connecting member 6 is completely detached from the moving portion 32 of the first rod member 3 and the second rod member 5. Alternatively, as illustrated as an example in the lower view in FIG. 27, the connecting member 6 (for example, the pin member 6a) may be configured so as not to be detached from the moving portion 32 of the first rod member 3 or the second rod member 5 (in other words, so as not to fall off of the moving portion 32 of the first rod member 3 or the second rod member 5) even in a state where the connection between the moving portion 32 of the first rod member 3 and the second rod member 5 is released. In the example illustrated in FIG. 27, the wire operating tool has a cam member 60 that changes the position of the connecting member 6 (more specifically, the pin member 6a) and an operating part 61 used for operating the cam member 60 by using a remote operating tool. In the example illustrated in FIG. 27, rotation of the cam member 60 about the rotation axis R2 causes the position of the connecting member 6 (more specifically, the pin member 6a) to change between a connected position to connect the moving portion 32 of the first rod member 3 and the second rod member 5 to each other and a connection release position to release the connection between the moving portion 32 of the first rod member 3 and the second rod member 5. Alternatively, the position of the connecting member 6 (more specifically, the pin member 6a) may be changed between the connected position and the connection release position by slide movement of the cam member 60. Further, the connecting member 6 may be pushed in a direction of approaching the connection release position from the connected position by the pushing member.

INDUSTRIAL APPLICABILITY

With the use of the wire operating tool, the component for the wire operating tool, the wire cutting and dividing method, and the wire connecting method of the present invention, it is possible to safely and efficiently perform wire cutting and dividing work and wire connecting work. Therefore, the present invention is useful for manufacturers of wire operating tools and business entities that implement wire cutting and dividing work and wire connecting work.

LIST OF REFERENCES

1, 1A, 1B, 1C wire operating tool
2 first wire gripping tool
3 first rod member
4 second wire gripping tool
5 second rod member
5h second hole
6 connecting member
6a pin member
7 load bearing member
8 fixing tool
8a first fixing tool
8b second fixing tool
8c third fixing tool
9 wire support tool
9a first wire support tool
9b second wire support tool
21 first gripping piece
22 second gripping piece
23 swing member
23a first swing member
23b second swing member
24 lever member
25 lock member
26 operating part
29 falling-off prevention member
30 base portion
30m base portion middle part
30s base end part
32 moving portion
32' second moving portion
32a pressing portion
32h first hole 32t tip
34 first connecting portion
38 second connecting block
39 connecting block
41 first gripping piece
42 second gripping piece
43 swing member
43a first swing member
43b second swing member
44 lever member
45 lock member
46 operating part
49 falling-off prevention member
50 plate
51 second connecting portion
51h through hole
51k through hole
51t second load transfer surface
54 second connecting portion
54a hook member
54b closure member
54c operating part
60 cam member
61 operating part
70 rod-like portion
70a first rod-like portion
70a-1 first portion
70a-2 second portion
70b second rod-like portion
71 first connecting portion
71h through hole
71t first load transfer surface
80 connecting portion
80a pressed portion
81 first gripping piece
82 second gripping piece
83 fixing tool operating part
91a, 91b frame member
92a, 92b closure member
93a, 93b operating part
100 stopper member
300 operating part
320 plate
AT1 first axis
AT2 second axis
AX longitudinal axis
AX1 axis
R1 rotation axis
R2 rotation axis
SP1, SP2 receiving space
SV connecting sleeve
Sa first end
Sb second end
W wire
W1 first wire
W2 second wire
Wa first cut end
Wb second cut end

The invention claimed is:

1. A wire operating tool comprising:
a first wire gripping tool;
a first rod member directly or indirectly connected to the first wire gripping tool and configured to be expanded and contracted in accordance with relative movement of a moving portion with respect to a base portion;
a second wire gripping tool;
a second rod member directly or indirectly connected to the second wire gripping tool;
a connecting member that connects the moving portion of the first rod member and the second rod member to each other in a separable manner; and
a load bearing member configured to bear a tensile load acting on the first wire gripping tool and the second wire gripping tool when the moving portion of the first rod member and the second rod member are in a separate state.

2. The wire operating tool according to claim 1, wherein the connecting member includes a pin member that connects the moving portion of the first rod member and the second rod member to each other.

3. The wire operating tool according to claim 2, further comprising a fixing tool that fixes a wire or a connecting sleeve,
wherein the fixing tool is either movable together with the moving portion of the first rod member or slidable with respect to the moving portion.

4. The wire operating tool according to claim 3,
wherein the load bearing member includes a first load transfer surface, and
wherein the second rod member includes a second load transfer surface configured to come into contact with the first load transfer surface.

5. The wire operating tool according to claim 3, further comprising a stopper member that changes a maximum separation distance between the first wire gripping tool and the second wire gripping tool.

6. The wire operating tool according to claim 2,
wherein the load bearing member includes a first load transfer surface, and
wherein the second rod member includes a second load transfer surface configured to come into contact with the first load transfer surface.

7. The wire operating tool according to claim 2, further comprising a stopper member that changes a maximum separation distance between the first wire gripping tool and the second wire gripping tool.

8. The wire operating tool according to claim 1, further comprising a fixing tool that fixes a wire or a connecting sleeve,
wherein the fixing tool is either movable together with the moving portion of the first rod member or slidable with respect to the moving portion.

9. The wire operating tool according to claim 8,
wherein the load bearing member includes a first load transfer surface, and
wherein the second rod member includes a second load transfer surface configured to come into contact with the first load transfer surface.

10. The wire operating tool according to claim 8, further comprising a stopper member that changes a maximum separation distance between the first wire gripping tool and the second wire gripping tool.

11. The wire operating tool according to claim 1,
wherein the load bearing member includes a first load transfer surface, and
wherein the second rod member includes a second load transfer surface configured to come into contact with the first load transfer surface.

12. The wire operating tool according to claim 11, further comprising a stopper member that changes a maximum separation distance between the first wire gripping tool and the second wire gripping tool.

13. The wire operating tool according to claim 12, the first rod member comprises a second moving portion that, when the moving portion moves in a first direction, moves in a second direction that is an opposite direction to the first direction.

14. The wire operating tool according to claim 11, wherein the first rod member comprises a second moving portion that, when the moving portion moves in a first direction, moves in a second direction that is an opposite direction to the first direction.

15. The wire operating tool according to claim 1, to further comprising a stopper member that changes a maximum separation distance between the first wire gripping tool and the second wire gripping tool.

16. The wire operating tool according to claim 15, the first rod member comprises a second moving portion that, when the moving portion moves in a first direction, moves in a second direction that is an opposite direction to the first direction.

17. The wire operating tool according to claim 1, to wherein the first rod member comprises a second moving portion that, when the moving portion moves in a first direction, moves in a second direction that is an opposite direction to the first direction.

18. A component for a wire operating tool comprising a first wire gripping tool, a second wire gripping tool, and a telescopic first rod member directly or indirectly connected to the first wire gripping tool, the component comprising:
  a moving member forming a part of the first rod member and movable relative to a base portion of the first rod member;
  a second rod member directly or indirectly connected to the second wire gripping tool;
  a connecting member that connects the moving member and the second rod member to each other in a separable manner; and
  a load bearing member configured to bear a tensile load acting on the first wire gripping tool and the second wire gripping tool when the moving member and the second rod member are in a separate state.

* * * * *